US012694694B2

(12) United States Patent
He et al.

(10) Patent No.: US 12,694,694 B2
(45) Date of Patent: Jul. 28, 2026

(54) METHOD AND APPARATUS FOR IDENTIFYING OBJECT OF INTEREST OF USER

(71) Applicant: YINWANG INTELLIGENT TECHNOLOGIES CO., LTD., Shenzhen (CN)

(72) Inventors: Yanshan He, Shenzhen (CN); Wei Huang, Munich (DE); Wenkang Xu, Shenzhen (CN); Junhao Zhang, Shanghai (CN)

(73) Assignee: YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 644 days.

(21) Appl. No.: 17/976,070

(22) Filed: Oct. 28, 2022

(65) Prior Publication Data

US 2023/0046258 A1     Feb. 16, 2023

Related U.S. Application Data

(63) Continuation of application No. PCT/CN2020/088243, filed on Apr. 30, 2020.

(51) Int. Cl.
*G06V 20/64* (2022.01)
*B60K 35/10* (2024.01)
(Continued)

(52) U.S. Cl.
CPC .............. *G06V 20/64* (2022.01); *B60K 35/10* (2024.01); *B60K 35/22* (2024.01); *B60K 35/235* (2024.01);
(Continued)

(58) Field of Classification Search
CPC ........ G06V 20/64; G06V 20/56; G06V 20/40; G02B 2027/0187; G02B 27/0179;
(Continued)

(56) References Cited

U.S. PATENT DOCUMENTS

| | | | |
|---|---|---|---|
| 2009/0237644 A1* | 9/2009 | Uechi | B60W 30/10 356/29 |
| 2016/0202944 A1* | 7/2016 | Dent | G06F 3/038 345/156 |

(Continued)

FOREIGN PATENT DOCUMENTS

| | | |
|---|---|---|
| CN | 101651772 A | 2/2010 |
| CN | 102063623 A | 5/2011 |

(Continued)

OTHER PUBLICATIONS

Vasli, Borhan, Sujitha Martin, and Mohan Manubhai Trivedi. "On driver gaze estimation: Explorations and fusion of geometric and data driven approaches." 2016 IEEE 19th International Conference on Intelligent Transportation Systems (ITSC). IEEE, 2016. (Year : 2016).*

(Continued)

*Primary Examiner* — John Villecco
*Assistant Examiner* — Alexander John Rodgers
(74) *Attorney, Agent, or Firm* — Fish & Richardson P.C.

(57) ABSTRACT

The present disclosure relates to methods and apparatuses for identifying an object of interest of a user. One example method includes obtaining information about a line-of-sight-gazed region of the user and an environment image corresponding to the user, obtaining information about a first gaze region of the user in the environment image based on the environment image, where the first gaze region is used to indicate a sensitive region determined by using a physical feature of a human body, and obtaining a target gaze region (Continued)

of the user based on the information about the line-of-sight-gazed region and the information about the first gaze region. The gaze region is used to indicate a region in which a target object gazed by the user in the environment image is located.

20 Claims, 8 Drawing Sheets

(51) Int. Cl.

| | |
|---|---|
| *B60K 35/22* | (2024.01) |
| *B60K 35/235* | (2024.01) |
| *B60K 35/28* | (2024.01) |
| *B60K 35/60* | (2024.01) |
| *B60K 35/85* | (2024.01) |
| *G02B 27/01* | (2006.01) |
| *G06F 3/01* | (2006.01) |
| *G06V 20/40* | (2022.01) |
| *G06V 20/56* | (2022.01) |
| *B60K 35/65* | (2024.01) |

(52) U.S. Cl.
CPC ............ *B60K 35/285* (2024.01); *B60K 35/60* (2024.01); *B60K 35/85* (2024.01); *G02B 27/0179* (2013.01); *G06F 3/013* (2013.01); *G06V 20/40* (2022.01); *G06V 20/56* (2022.01); *B60K 35/654* (2024.01); *B60K 35/656* (2024.01); *G02B 2027/0187* (2013.01)

(58) Field of Classification Search
CPC .... B60K 35/00; B60K 35/654; B60K 35/656; B60K 35/23; G06F 3/013
See application file for complete search history.

(56) References Cited

U.S. PATENT DOCUMENTS

| | | | |
|---|---|---|---|
| 2016/0291690 A1 | 10/2016 | Thorn et al. | |
| 2018/0130223 A1* | 5/2018 | Nadler | G06T 7/70 |
| 2018/0362053 A1* | 12/2018 | Isa | B60W 50/14 |
| 2019/0278094 A1* | 9/2019 | Huang | G02B 27/0093 |
| 2019/0318181 A1 | 10/2019 | Katz et al. | |
| 2021/0197665 A1 | 7/2021 | Won | |

FOREIGN PATENT DOCUMENTS

| | | | | | |
|---|---|---|---|---|---|
| CN | 103246350 A | | 8/2013 | | |
| CN | 104228688 A | | 12/2014 | | |
| CN | 104590130 A | | 5/2015 | | |
| CN | 105620364 A | | 6/2016 | | |
| CN | 106527710 A | | 3/2017 | | |
| CN | 107111629 A | | 8/2017 | | |
| CN | 107920734 A | | 4/2018 | | |
| CN | 108860064 A | | 11/2018 | | |
| CN | 109551489 A | | 4/2019 | | |
| CN | 109917920 A | | 6/2019 | | |
| CN | 110116619 A | * | 8/2019 | ............ | B60K 35/00 |
| CN | 110850974 A | | 2/2020 | | |
| CN | 110929703 A | | 3/2020 | | |
| DE | 102017116702 A1 | | 1/2019 | | |
| WO | 2016161954 A1 | | 10/2016 | | |
| WO | 2019107730 A1 | | 6/2019 | | |

OTHER PUBLICATIONS

Gomaa, Amr, et al. "Studying person-specific pointing and gaze behavior for multimodal referencing of outside objects from a moving vehicle." Proceedings of the 2020 International Conference on Multimodal Interaction. 2020. (Year: 2020).*

Wang, Shu, et al. "Reducing driver distraction by utilizing augmented reality head-up display system for rear passengers." 2019 IEEE International Conference on Consumer Electronics (ICCE). IEEE, 2019. (Year: 2019).*

Zhang et al., "An approach of region of interest detection based on visual attention and gaze tracking," In 2012 IEEE International Conference on Signal Processing, Communication and Computing (ICSPCC 2012), Aug. 12, 2012, 6 pages.

Extended European Search Report in European Appln No. 20933677. 5, dated May 3, 2023, 11 pages.

International Search Report and Written Opinion in International Appln. No. PCT/CN2020/088243, mailed on Jan. 28, 2021, 16 pages (with English translation).

* cited by examiner

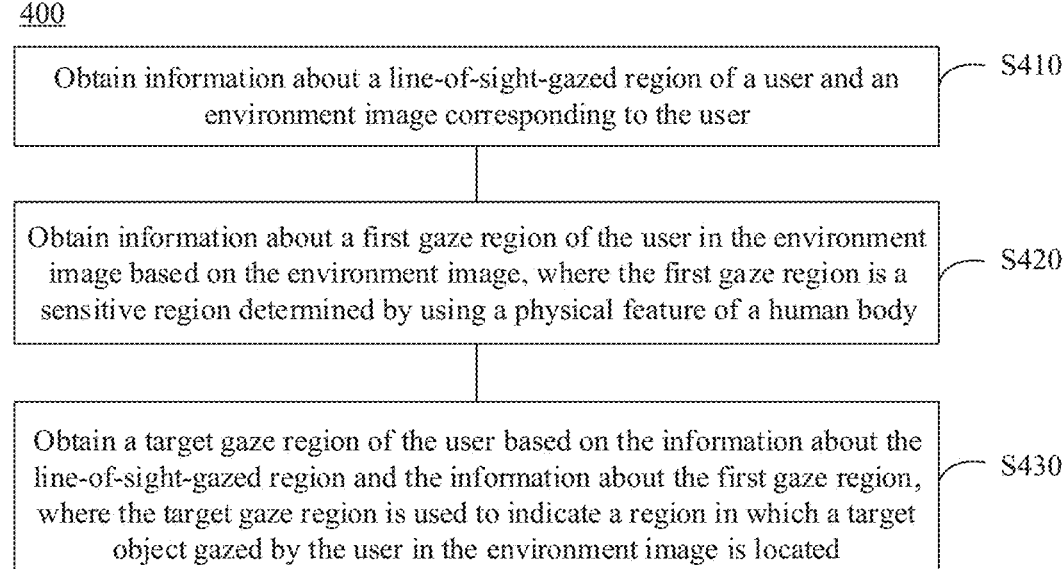

400

Obtain information about a line-of-sight-gazed region of a user and an environment image corresponding to the user — S410

Obtain information about a first gaze region of the user in the environment image based on the environment image, where the first gaze region is a sensitive region determined by using a physical feature of a human body — S420

Obtain a target gaze region of the user based on the information about the line-of-sight-gazed region and the information about the first gaze region, where the target gaze region is used to indicate a region in which a target object gazed by the user in the environment image is located — S430

FIG. 5

Calculate a line-of-sight-gazed region of a driver — S510

Calculate a location of the driver's head — S520

Calculate a DVR line-of-sight-gazed region — S530

Predetermine scenario attention — S540

Determine a scenario attention region — S550

Determine an intention — S560

FIG. 6

| | |
|---|---|
| Calibrate an intrinsic parameter and an extrinsic parameter of a DMS/CMS | S610 |
| Detect key points $P_1$ and $P_2$ in a DMS/CMS view | S620 |
| Calculate a straight line on which the key points are located in the DMS/CMS | S630 |
| Calculate 3D straight lines on which the key points are located in the DMS/CMS | S640 |
| Calculate a center point P of a 3D location of a human body | S650 |

METHOD AND APPARATUS FOR IDENTIFYING OBJECT OF INTEREST OF USER

CROSS-REFERENCE TO RELATED APPLICATIONS

This application is a continuation of International Application No. PCT/CN2020/088243, filed on Apr. 30, 2020, the disclosure of which is hereby incorporated by reference in its entirety.

TECHNICAL FIELD

This application relates to the intelligent vehicle field, and more specifically, to a method and an apparatus for identifying an object of interest of a user.

BACKGROUND

With continuous development of the artificial intelligence technology, a user imposes an increasingly high requirement for experience feeling, and therefore expects to obtain more intelligent human-computer interaction experience.

In a driving process, a driver may have an interest in an object in a region outside a vehicle. However, to ensure driving safety, the driver cannot keep an eye on the object of interest in the region outside the vehicle for a long time, and may be unable to understand detailed information of the object. As a result, the object of interest of the driver cannot be effectively recorded, which reduces driving experience of the driver.

Therefore, how to accurately identify an object of interest of a user to improve user experience becomes a problem that needs to be resolved urgently.

SUMMARY

This application provides a method and an apparatus for identifying an object of interest of a user, and the identification method and the identification apparatus in this application can be used to improve accuracy of identifying an object of interest of a user.

According to a first aspect, a method for identifying an object of interest of a user is provided, including: obtaining information about a line-of-sight-gazed region of a user and an environment image corresponding to the user; obtaining information about a first gaze region of the user in the environment image based on the environment image, where the first gaze region is used to indicate a sensitive gaze region determined by using a physical feature of a human body; and obtaining a target gaze region of the user based on the information about the line-of-sight-gazed region and the information about the first gaze region, where the target gaze region is used to indicate a region in which a target object gazed by the user in the environment image is located.

The environment image corresponding to the user may be an image of an environment in which the user is located.

In one possible implementation, in the intelligent vehicle field, the user may be a driver of a vehicle or a passenger in the vehicle, and the environment image corresponding to the user may be an image of an environment in which the vehicle is located or an image of an environment outside the vehicle.

In another possible implementation, in the intelligent terminal field, the user may be a user of a smart home device in a home, and the environment image corresponding to the user may be an image of the home in which the user of the smart home device is located.

It should be noted that the information about the line-of-sight-gazed region of the user may include location information of the line-of-sight-gazed region of the user, a direction of the line-of-sight-gazed region of the user, a range of the line-of-sight-gazed region of the user, and the like.

It should be understood that the first gaze region in the environment image is a sensitive region of the user determined by using a biological feature of a human body, but is unnecessarily a gaze region of the user. The sensitive region may be a region that easily draws attention of the user and that is determined based on a physical feature of the human body, for example, a degree of sensitivity of a human eye to different colors and a shape change.

For example, photosensitivity of a visual nerve of a human eye to various different wavelengths of light is different. The human eye is most sensitive to an electromagnetic wave whose wavelength is about 555 nm. The electromagnetic wave is located in a green light region of a spectrum, so that the human eye is relatively sensitive to green light. Therefore, a sensitive region of a user in an image may be a green region in the image.

It should be further understood that the first gaze region in the environment image may be a sensitive region of the user that is in the environment image and that is predetermined in advance based on a physical feature of a human body. The target gaze region is the region in which the target object gazed by the user in the environment image is located. First gaze regions for different users may be the same in the environment image. However, for different users, target gaze regions may be regions in which target objects in which the users have an interest and at which the users gaze based on their own interests in the environment image are located.

In a possible implementation, the first gaze region in the environment image may be represented by using an interest value of each region in the image. The interest value may be obtained as follows: Form change richness is obtained by using a deep learning method or an edge detection method, color change richness is obtained by using a gradient calculation method, and weighting calculation is performed on the two values to obtain the interest value at each location in the image. It is predetermined, based on the interest value at each location in the image, a specific region that is in the environment image and in which the user may have an interest.

In this embodiment of this application, predetermining of an environment image is introduced when an object of interest of a user is identified. To be specific, a target gaze region of the user is determined based on a region to which the user may be sensitive in the environment image and a line-of-sight-gazed region of the user, thereby improving accuracy of identifying an object of interest of a user.

With reference to the first aspect, in some implementations of the first aspect, the obtaining a target gaze region of the user based on the information about the line-of-sight-gazed region and the information about the first gaze region includes:

determining the target gaze region based on an overlapping region between the line-of-sight-gazed region and the first gaze region.

In this embodiment of this application, predetermining of an environment image is introduced when an object of interest of a user is identified. To be specific, a target gaze region of the user, that is, a region in which a target object of interest of the user is located, is determined based on an overlapping region between a sensitive region of the user and a line-of-sight-gazed region of the user that are in the environment image, thereby improving accuracy of identifying an object of interest of a user.

With reference to the first aspect, in some implementations of the first aspect, the user is a user in a vehicle. The obtaining information about a line-of-sight-gazed region of a user and an environment image corresponding to the user includes: obtaining information about a line-of-sight-gazed region of the user in the vehicle and an image of a driving video record in the vehicle, where the line-of-sight-gazed region of the user in the vehicle is used to indicate a gaze region that is of the user in the vehicle and that is outside the vehicle. The obtaining a target gaze region of the user based on the information about the line-of-sight-gazed region and the information about the first gaze region includes: determining the target gaze region of the user in the vehicle based on the information about the line-of-sight-gazed region of the user in the vehicle and the information about the first gaze region in the image of the driving video record.

The user in the vehicle may mean that the user is located inside the vehicle. For example, the user may be a driver of the vehicle, or the user may be a passenger in the vehicle.

In a possible implementation, if the user in the vehicle is the driver of the vehicle, the line-of-sight-gazed region of the driver is used to indicate a gaze region of the driver in a front windshield direction of the vehicle.

In a possible implementation, if the user in the vehicle is the passenger in the vehicle, for example, a passenger in a front passenger's seat, the line-of-sight-gazed region of the user is used to indicate a gaze region of the passenger in a front windshield direction of the vehicle or a gaze region in a vehicle window direction of the vehicle.

In a possible implementation, if the user in the vehicle is a passenger in a back seat in the vehicle, the line-of-sight-gazed region of the user is used to indicate a gaze region of the passenger in a vehicle window direction of the vehicle.

In a possible implementation, the user in the vehicle may be a driver of the vehicle or a passenger in the vehicle. In this case, the line-of-sight-gazed region of the user in the vehicle may be obtained as follows: An image of the user is obtained by using a camera in a vehicle cab. Further, the line-of-sight-gazed region of the user is determined based on a facial status and an eye status of the user in the image of the user in the vehicle, that is, a gaze region of the user in a windshield direction of the vehicle is determined. The camera in the cab may be a camera in a driver monitoring system or a cockpit monitoring system.

With reference to the first aspect, in some implementations of the first aspect, the obtaining information about a line-of-sight-gazed region of the user in the vehicle and an image of a driving video record in the vehicle includes: obtaining information about line-of-sight-gazed regions of the user in the vehicle in N frames of images and M frames of images of the driving video record, where the N frames of images and the M frames of images of the driving video record are images obtained from a same start moment to a same end moment. The determining the target gaze region of the user in the vehicle based on the information about the line-of-sight-gazed region of the user in the vehicle and the information about the first gaze region in the image of the driving video record includes: determining that a difference between the line-of-sight-gazed regions of the user in the vehicle in the N frames of images meets a first preset range; determining that a difference between the first gaze regions in the M frames of images of the driving video record meets a second preset range; determining an overlapping region based on the line-of-sight-gazed regions of the user in the vehicle in the N frames of images and the first gaze regions in the M frames of images of the driving video record; and determining the target gaze region of the user in the vehicle based on the overlapping region.

With reference to the first aspect, in some implementations of the first aspect, the difference between the line-of-sight-gazed regions is a location difference between the line-of-sight-gazed regions, and the difference between the first gaze regions is a location difference between the first gaze regions.

In a possible implementation, the obtained N frames of images of the user in the vehicle and the obtained M frames of images of the driving video record may be images obtained in an allowed time difference range. In other words, a moment at which the N frames of images of the user in the vehicle are obtained may be similar or close to a moment at which the M frames of images of the driving video record are obtained.

In a possible implementation, if there is a specific allowed time difference between the obtained N frames of images of the user in the vehicle and the obtained M frames of images of the driving video record, line-of-sight-gazed regions of the user in the vehicle in several subsequent frames of images may be predicted based on the obtained N frames of images of the user in the vehicle, or first gaze regions in several subsequent frames of images may be predicted based on the M frames of images of the driving video record.

In a possible implementation, the line-of-sight-gazed regions of the user in the vehicle in the obtained N frames of images may be N frames of images of the user in the vehicle that are collected by a camera configured in vehicle cab. The line-of-sight-gazed regions of the user in the N frames of images may be determined based on the N frames of images of the user in the vehicle. For example, a gaze region of the user in a windshield direction of the vehicle may be determined by using head locations of the user in the N frames of images of the user in the vehicle.

It should be further understood that from a same start moment to a same end moment, a quantity of obtained N frames of images (for example, the N frames of images of the user in the vehicle) may be the same as or different from a quantity of obtained M frames of images of the driving video record.

In a possible implementation, a line-of-sight of the driver may be first tracked. To be specific, it is determined that a difference between the obtained N frames of images, namely, N frames of images of the driver, meets the first preset range, that is, it may be determined that line-of-sight-gazed regions of the driver in the obtained N frames of images of the driver are not directly in the front and a change difference between the line-of-sight-gazed regions in the N frames of images remains relatively small. In this case, it may be determined that the driver gazes at an object of interest in a scenario outside the vehicle. In addition, it is determined that the difference between the obtained M frames of images of the driving video record meets the second preset range. In this case, it may be determined that a same object continuously photographed by the driving video record in a plurality of frames is not lost. In this case, an overlapping region between the line-of-sight-gazed regions of the driver in the N frames of images and the M frames of images of the driving video record is further determined, to determine a target gaze region of the driver. A plurality of frames of images meet the first preset range and the second preset range, to ensure robustness of the method for identifying an object of interest of a user provided in this application.

With reference to the first aspect, in some implementations of the first aspect, the method further includes: mapping the line-of-sight-gazed region of the user in the vehicle to an imaging plane on which the image of the driving video record is located; or mapping the image of the driving video record to an imaging plane on which the line-of-sight-gazed region of the user in the vehicle is located.

In this embodiment of this application, to help determine an overlapping region, that is, an overlapping part, between the line-of-sight-gazed region of the user in the vehicle and the first gaze region in the environment image, images located on two imaging planes may be projected onto a same imaging plane. To be specific, the line-of-sight-gazed region of the user in the vehicle may be mapped to the imaging plane on which the image of the driving video record is located, or the image of the driving video record may be mapped to the imaging plane on which the line-of-sight-gazed region of the user in the vehicle is located.

With reference to the first aspect, in some implementations of the first aspect, the method further includes: displaying information about the target gaze region on a display of the vehicle.

With reference to the first aspect, in some implementations of the first aspect, the vehicle includes a plurality of displays, and the displaying information about the target gaze region on a display of the vehicle includes:

determining a target display in the plurality of displays based on location information that is of the user in the vehicle and that is in the vehicle; and displaying the information about the target gaze region on the target display.

In a possible implementation, identity information of the user is determined based on the location information of the user in the vehicle, and the identity information may include a driver or a passenger. Further, the information about the target gaze region may be pushed to the user based on the identity information of the user. For example, the information about the target gaze region may be displayed on a display at a corresponding location, or the information about the target gaze region may be broadcast, or the information about the target region may be pushed to a mobile phone of the user, so that the user can subsequently continue to learn of the information about the target gaze region.

For example, if it is detected that the user is a driver, the information about the target gaze region may be displayed in the vehicle by using a head-up display HUD system, for example, the information about the target gaze region may be displayed on a front windshield.

For example, if it is detected that the user is a passenger in a front passenger's seat or in a back seat in the vehicle, the information about the target gaze region may be displayed on a display corresponding to the location.

With reference to the first aspect, in some implementations of the first aspect, the information about the target gaze region is displayed in the vehicle by using a head-up display HUD system.

In a possible implementation, the method for identifying an object of interest of a user may be applied to an intelligent terminal scenario. In the intelligent terminal scenario, the method provided in this application may be used to identify an object of interest of a user, to provide a more intelligent service for the user, thereby effectively improving user experience.

According to a second aspect, an apparatus for identifying an object of interest of a user is provided, including: an obtaining module, configured to obtain information about a line-of-sight-gazed region of a user and an environment image corresponding to the user; and a processing module, configured to: obtain information about a first gaze region of the user in the environment image based on the environment image, where the first gaze region is used to indicate a sensitive region determined by using a physical feature of a human body; and obtain a target gaze region of the user based on the information about the line-of-sight-gazed region and the information about the first gaze region, where the target gaze region is used to indicate a region in which a target object gazed by the user in the environment image is located.

The environment image corresponding to the user may be an image of an environment in which the user is located.

In one possible implementation, in the intelligent vehicle field, the user may be a driver of a vehicle or a passenger in the vehicle, and the environment image corresponding to the user may be an image of an environment in which the vehicle is located or an image of an environment outside the vehicle.

It should be noted that the information about the line-of-sight-gazed region of the user may include location information of the line-of-sight-gazed region of the user, a direction of the line-of-sight-gazed region of the user, a range of the line-of-sight-gazed region of the user, and the like.

In another possible implementation, in the intelligent terminal field, the user may be a user of a smart home device in a home, and the environment image corresponding to the user may be an image of the home in which the user of the smart home device is located.

It should be understood that the first gaze region in the environment image is a sensitive region of the user determined by using a biological feature of a human body, but is unnecessarily a gaze region of the user. The sensitive region may be a region that easily draws attention of the user and that is determined based on a physical feature of the human body, for example, a degree of sensitivity of a human eye to different colors and a shape change.

For example, photosensitivity of a visual nerve of a human eye to various different wavelengths of light is different. The human eye is most sensitive to an electromagnetic wave whose wavelength is about 555 nm. The electromagnetic wave is located in a green light region of a spectrum, so that the human eye is relatively sensitive to green light. Therefore, a sensitive region of a user in an image may be a green region in the image.

It should be further understood that the first gaze region in the environment image may be a sensitive region of the user that is in the environment image and that is predetermined in advance based on a physical feature of a human body. The target gaze region a gaze region of the user in the environment image, that is, the region in which the target object gazed by the user is located. First gaze regions for different users may be the same in the environment image. However, for different users, target gaze regions may be regions in which objects in which the users have an interest and at which the users gaze based on their own interests in the environment image are located.

In a possible implementation, the first gaze region in the environment image may be represented by using an interest value of each region in the image. The interest value may be obtained as follows: Form change richness is obtained by using a deep learning method or an edge detection method, color change richness is obtained by using a gradient cal- culation method, and weighting calculation is performed on the two values to obtain the interest value at each location in the image. It is predetermined, based on the interest value at each location in the image, a specific region that is in the environment image and in which the user may have an interest.

In this embodiment of this application, predetermining of an environment image is introduced when an object of interest of a user is identified. To be specific, a target gaze region of the user is determined based on a sensitive region of the user and a line-of-sight-gazed region of the user that are in the environment image, thereby improving accuracy of identifying an object of interest of a user.

With reference to the second aspect, in some implemen- tations of the second aspect, the processing module is specifically configured to:

determine the target gaze region based on an overlapping region between the line-of-sight-gazed region and the first gaze region.

In this embodiment of this application, predetermining of an environment image is introduced when an object of interest of a user is identified. To be specific, a target gaze region of the user, that is, a region in which a target object of interest of the user is located, is determined based on an overlapping region between a sensitive region of the user and a line-of-sight-gazed region of the user that are in the environment image, thereby improving accuracy of identi- fying an object of interest of a user.

With reference to the second aspect, in some implemen- tations of the second aspect, the user is a user in a vehicle, and the obtaining module is specifically configured to obtain information about a line-of-sight-gazed region of the user in the vehicle and an image of a driving video record in the vehicle, where the line-of-sight-gazed region of the user in the vehicle is used to indicate a gaze region that is of the user in the vehicle and that is outside the vehicle.

The processing module is specifically configured to deter- mine a target gaze region of the driver based on the information about the line-of-sight-gazed region of the driver and the information about the first gaze region in the image of the driving video record.

The user in the vehicle may mean that the user is located inside the vehicle. For example, the user may be a driver of the vehicle, or the user may be a passenger in the vehicle.

In a possible implementation, if the user in the vehicle is the driver of the vehicle, the line-of-sight-gazed region of the driver is used to indicate a gaze region of the driver in a front windshield direction of the vehicle.

In a possible implementation, if the user in the vehicle is the passenger in the vehicle, for example, a passenger in a front passenger's seat, the line-of-sight-gazed region of the user is used to indicate a gaze region of the passenger in a front windshield direction of the vehicle or a gaze region in a vehicle window direction of the vehicle.

In a possible implementation, if the user in the vehicle is a passenger in a back seat in the vehicle, the line-of-sight- gazed region of the user is used to indicate a gaze region of the passenger in a vehicle window direction of the vehicle.

In a possible implementation, the user in the vehicle may be a driver of the vehicle or a passenger in the vehicle. In this case, the line-of-sight-gazed region of the user in the vehicle may be obtained as follows: An image of the user located inside the vehicle is obtained by using a camera in a vehicle cab. Further, the line-of-sight-gazed region of the user is determined based on a facial status and an eye status of the user in the image of the user, that is, a gaze region of the user on a windshield of the vehicle is determined. The camera in the cab may be a camera in a driver monitoring system or a cockpit monitoring system.

With reference to the second aspect, in some implemen- tations of the second aspect, the obtaining module is spe- cifically configured to obtain information about line-of- sight-gazed regions of the user in the vehicle in N frames of images and M frames of images of the driving video record.

The processing module is specifically configured to:

determine that a difference between the line-of-sight- gazed regions of the user in the vehicle in the N frames of images meets a first preset range; determine that a difference between the first gaze regions in the M frames of images of the driving video record meets a second preset range; determine an overlapping region based on the line-of-sight-gazed regions of the user in the vehicle in the N frames of images and the first gaze regions in the M frames of images of the driving video record; and determine the target gaze region of the user in the vehicle based on the overlapping region.

With reference to the second aspect, in some implemen- tations of the second aspect, the difference between the line-of-sight-gazed regions is a location difference between the line-of-sight-gazed regions, and the difference between the first gaze regions is a location difference between the first gaze regions.

In a possible implementation, the obtained N frames of images may be obtained N frames of images of the user in the vehicle, and the N frames of images of the user in the vehicle and the M frames of images of the driving video record are images obtained in a same time period, that is, images obtained from a same start moment to a same end moment.

In a possible implementation, the obtained N frames of images of the user in the vehicle and the obtained M frames of images of the driving video record may be images obtained in an allowed time difference range. In other words, a moment at which the N frames of images of the user in the vehicle are obtained may be similar or close to a moment at which the M frames of images of the driving video record are obtained.

In a possible implementation, if there is a specific allowed time difference between the obtained N frames of images of the user in the vehicle and the obtained M frames of images of the driving video record, line-of-sight-gazed regions of the user in the vehicle in several subsequent frames of images may be predicted based on the obtained N frames of images of the user in the vehicle, or first gaze regions in several subsequent frames of images may be predicted based on the M frames of images of the driving video record.

It should be further understood that from a same start moment to a same end moment, a quantity of obtained N frames of images (for example, the N frames of images of the user in the vehicle) may be the same as or different from a quantity of obtained M frames of images of the driving video record.

In this embodiment of this application, a line-of-sight of the user in the vehicle (for example, the driver of the vehicle) may be first tracked. To be specific, it is determined that a difference between the obtained N frames of images, namely, N frames of images of the driver, meets the first preset range, that is, it may be determined that line-of-sight- gazed regions of the driver in the obtained N frames of images of the driver are not directly in the front and a change difference between the line-of-sight-gazed regions in the N frames of images remains relatively small. In this case, it may be determined that the driver gazes at an object of interest in a scenario outside the vehicle. In addition, it is determined that the difference between the obtained M frames of images of the driving video record meets the second preset range. In this case, it may be determined that a same object continuously photographed by the driving video record in a plurality of frames is not lost. In this case, an overlapping region between the line-of-sight-gazed regions of the driver in the N frames of images and the M frames of images of the driving video record is further determined, to determine a target gaze region of the driver. A plurality of frames of images meet the first preset range and the second preset range, to ensure robustness of the method for identifying an object of interest of a user provided in this application.

With reference to the second aspect, in some implementations of the second aspect, the processing module is further configured to:

map the information about the line-of-sight-gazed region of the user in the vehicle to an imaging plane on which the image of the driving video record is located; and map information about the image of the driving video record to an imaging plane on which the line-of-sight-gazed region of the user in the vehicle is located.

In this embodiment of this application, to help determine an overlapping region, that is, an overlapping part, between the line-of-sight-gazed region of the driver and the first gaze region in the environment image, images located on two imaging planes may be projected onto a same imaging plane. To be specific, the line-of-sight-gazed region of the driver may be mapped to the imaging plane on which the image of the driving video record is located, or the image of the driving video record may be mapped to the imaging plane on which the line-of-sight-gazed region of the driver is located.

With reference to the second aspect, in some implementations of the second aspect, the processing module is further configured to:

display information about the target gaze region on a display of the vehicle.

With reference to the second aspect, in some implementations of the second aspect, the vehicle includes a plurality of displays, and the processing module is specifically configured to:

determine a target display in the plurality of displays based on location information that is of the user in the vehicle and that is in the vehicle; and display the information about the target gaze region on the target display.

In a possible implementation, identity information of the user is determined based on the location information of the user in the vehicle, and the identity information may include a driver or a passenger. Further, the information about the target gaze region may be pushed to the user based on the identity information of the user. For example, the information about the target gaze region may be displayed on a display at a corresponding location, or the information about the target gaze region may be broadcast, or the information about the target region may be pushed to a mobile phone of the user, so that the user can subsequently continue to learn of the information about the target gaze region.

For example, if it is detected that the user is a driver, the information about the target gaze region may be displayed in the vehicle by using a head-up display HUD system, for example, the information about the target gaze region may be displayed on a front windshield.

For example, if it is detected that the user is a passenger in a front passenger's seat or in a back seat in the vehicle, the information about the target gaze region may be displayed on a display corresponding to the location.

With reference to the second aspect, in some implementations of the second aspect, the information about the target gaze region is displayed in the vehicle by using a head-up display HUD system.

With reference to the second aspect, in some implementations of the second aspect, the identification apparatus is a vehicle-mounted device in the vehicle.

In a possible implementation, the apparatus for identifying an object of interest of a user may be applied to an intelligent terminal scenario. In the intelligent terminal scenario, the identification apparatus provided in this application may be used to identify an object of interest of a user, to provide a more intelligent service for the user, thereby effectively improving user experience.

According to a third aspect, an apparatus for identifying an object of interest of a user is provided, including: a memory, configured to store a program; and a processor, configured to execute the program stored in the memory. When the program stored in the memory is executed, the processor is configured to perform the following process: obtaining information about a line-of-sight-gazed region of a user and an environment image corresponding to the user; obtaining information about a first gaze region of the user in the environment image based on the environment image, where the first gaze region is used to indicate a sensitive region determined by using a physical feature of a human body; and obtaining a target gaze region of the user based on the information about the line-of-sight-gazed region and the information about the first gaze region, where the target gaze region is used to indicate a region in which a target object gazed by the user in the environment image is located.

In a possible implementation, the processor included in the identification apparatus is further configured to perform the method for identifying an object of interest of a user according to any one of the first aspect and the implementations of the first aspect.

It should be understood that extension, limitation, explanation, and description of related content in the first aspect are also applicable to same content in the third aspect.

According to a fourth aspect, a vehicle is provided, where the vehicle includes the identification apparatus according to any one of the second aspect and the implementations of the second aspect.

According to a fifth aspect, a vehicle system is provided, including a camera configured inside a vehicle, a driving video record, and the identification apparatus according to any one of the second aspect and the implementations of the second aspect.

The camera configured in the vehicle may be a camera in a driver monitoring system (driver monitoring system, DMS) or a camera in a cockpit monitoring system (cockpit monitoring system, CMS). A location of the camera may be near an A-pillar (A-pillar) of the vehicle, or may be a location of a steering wheel or a dashboard, a location near a rear-view mirror, or the like.

According to a sixth aspect, a computer-readable storage medium is provided. The computer-readable storage medium is configured to store program code, and when the program code is executed by a computer, the computer is configured to perform the method for identifying an object of interest of a user according to any one of the first aspect and the implementations of the first aspect.

According to a seventh aspect, a chip is provided. The chip includes a processor, and the processor is configured to perform the method for identifying an object of interest of a user according to any one of the first aspect and the implementations of the first aspect.

In a possible implementation, the chip in the seventh aspect may be located in an in-vehicle terminal in a vehicle.

According to an eighth aspect, a computer program product is provided. The computer program product includes computer program code, and when the computer program code is run on a computer, the computer is enabled to perform the method for identifying an object of interest of a user according to any one of the first aspect and the implementations of the first aspect.

It should be noted that all or a part of the computer program code may be stored in a first storage medium. The first storage medium may be encapsulated together with a processor, or the first storage medium and the processor may be separately encapsulated. This is not specifically limited in this embodiment of this application.

BRIEF DESCRIPTION OF DRAWINGS

FIG. 5 is a schematic flowchart of a method for identifying an object of interest of a user according to an embodiment of this application;

FIG. 6 is a schematic flowchart of a method for identifying an object of interest of a user according to an embodiment of this application;

DESCRIPTION OF EMBODIMENTS

The following describes the technical solutions in embodiments of this application with reference to the accompanying drawings in embodiments of this application. It is clear that the described embodiments are merely some rather than all of embodiments of this application. All other embodiments obtained by a person of ordinary skill in the art based on embodiments of this application without creative efforts shall fall within the protection scope of this application.

First, an application scenario of the embodiments of this application is described by using an example.

Figure 1:
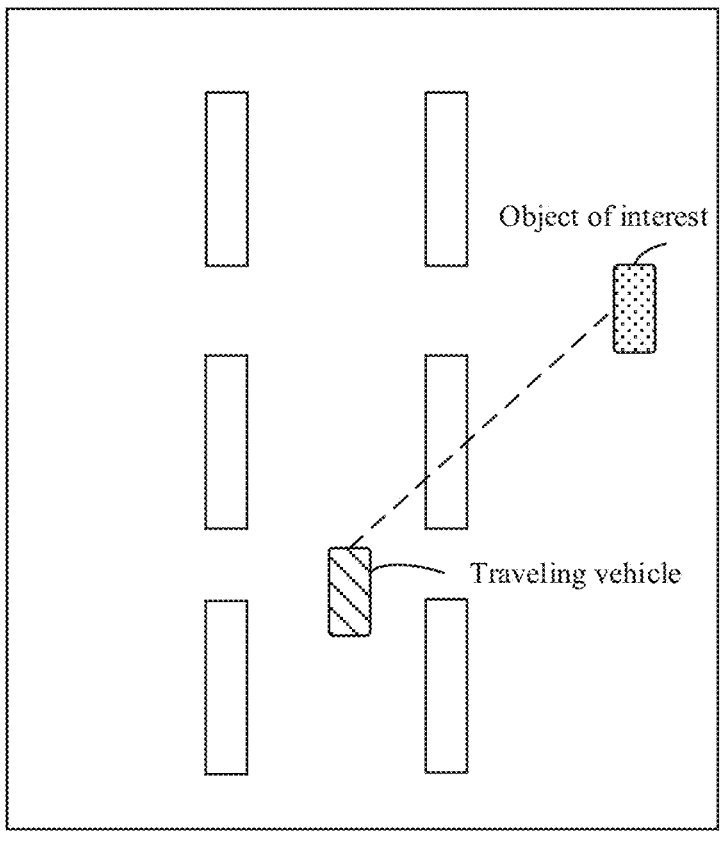
FIG. 1 is a schematic diagram of an application scenario according to an embodiment of this application.

For example, FIG. 1 is a schematic diagram of an application scenario of a method for identifying an object of interest of a user according to an embodiment of this application.

As shown in FIG. 1, the method for identifying an object of interest of a user provided in this embodiment of this application may be applied to the intelligent vehicle field.

For example, in a driving process, a user in a vehicle (for example, a driver or a passenger in the vehicle) may have an interest in an object on a roadside, for example, a billboard on the roadside. However, due to consideration of driving safety, the driver cannot keep an eye on the object of interest for a long time, and therefore cannot immediately understand detailed information of the object of interest. Alternatively, because a traveling speed of the vehicle during driving is relatively fast, the passenger in the vehicle cannot understand a target object of interest outside the vehicle in time. As a result, a point of interest of the user in the vehicle cannot be effectively recorded. According to the method for identifying an object of interest provided in this embodiment of this application, through interaction between a line-of-sight of a user in a vehicle and the outside of the vehicle, a target object of interest of the user in the vehicle during driving may be accurately identified, and corresponding information is pushed to the user in the vehicle based on this, thereby effectively improving experience feeling of the user.

Figure 2:
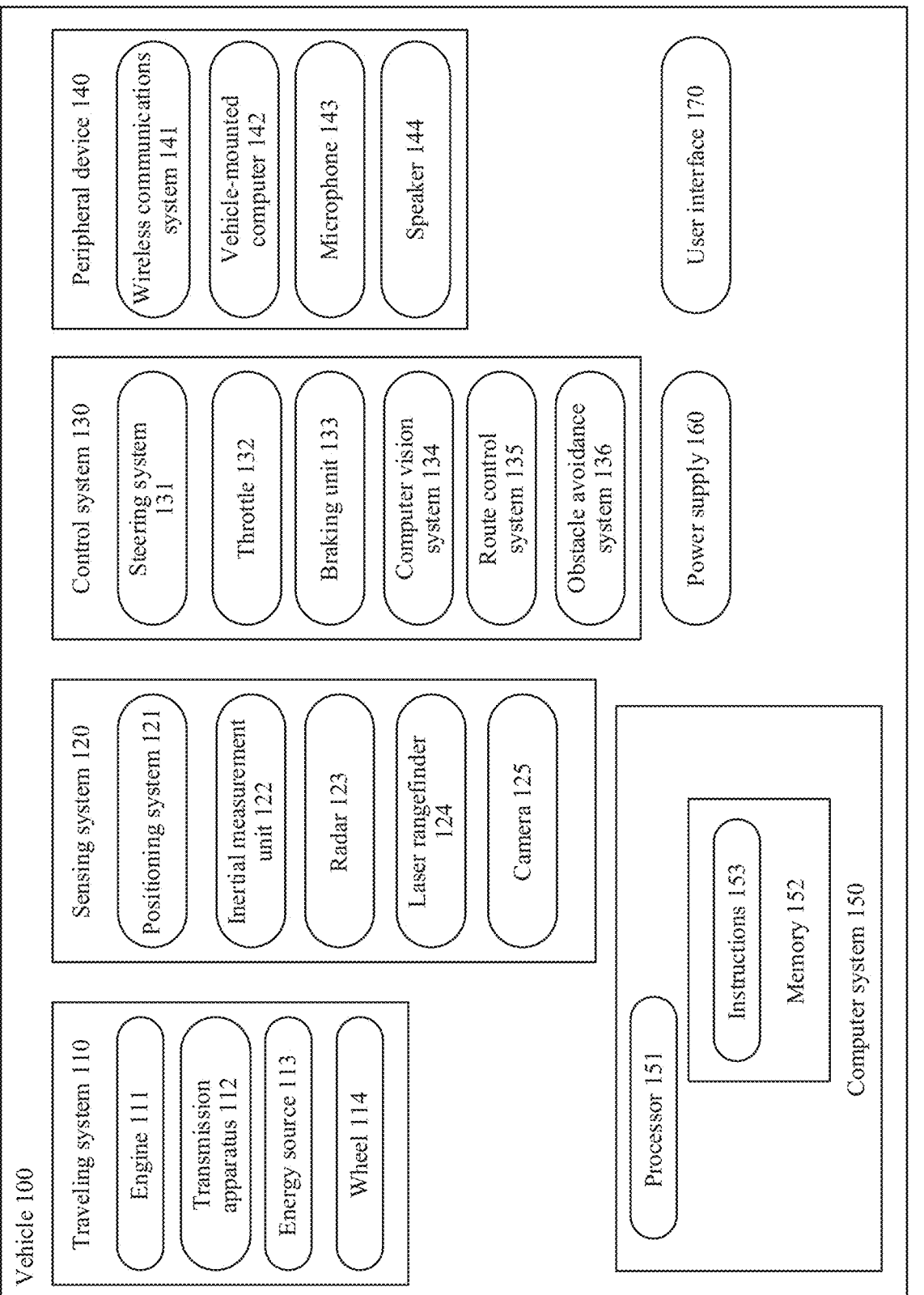
FIG. 2 is a block diagram of a function of a vehicle 100 according to an embodiment of this application.

FIG. 2 is a block diagram of a function of a vehicle 100 according to an embodiment of this application.

The vehicle 100 may be a manually driven vehicle, or the vehicle 100 may be completely or partially configured to be in a self-driving mode.

In an example, the vehicle 100 may control itself when being in the self-driving mode. In addition, a manual operation may be used to determine a current status of the vehicle and a current status of a surrounding environment of the vehicle, determine a possible behavior of at least one another vehicle in the surrounding environment, determine a confidence level corresponding to a possibility of performing the possible behavior by the another vehicle, and control the vehicle 100 based on the determined information. When the vehicle 100 is in the self-driving mode, the vehicle 100 may be configured to operate without interaction with a person.

The vehicle 100 may include various subsystems, for example, a traveling system 110, a sensing system 120, a control system 130, one or more peripheral devices 140, a power supply 160, a computer system 150, and a user interface 170.

Optionally, the vehicle 100 may include more or less subsystems, and each subsystem may include a plurality of elements. In addition, the subsystems and the elements of the vehicle 100 may be wired or wirelessly interconnected.

For example, the traveling system 110 may include a component configured to provide power to the vehicle 100 for movement. In an embodiment, the traveling system 110 may include an engine 111, a transmission apparatus 112, an energy source 113, and a wheel 114. The engine 111 may be an internal combustion engine, a motor, an air compression engine, or another type of engine combination, for example, a hybrid engine including a gasoline engine and a motor, or a hybrid engine including an internal combustion engine and an air compression engine. The engine 111 may convert the energy source 113 into mechanical energy.

For example, the energy source 113 may include gasoline, diesel, another oil-based fuel, propane, another compressed gas-based fuel, ethanol, a solar panel, a battery, and another power source. The energy source 113 may also provide energy for another system of the vehicle 100.

For example, the transmission apparatus 112 may include a gearbox, a differential, and a driving shaft. The transmission apparatus 112 may transmit mechanical power from the engine 111 to the wheel 114.

In an embodiment, the transmission apparatus 112 may further include another component, such as a clutch. The driving shaft may include one or more shafts that may be coupled to one or more wheels 114.

For example, the sensing system 120 may include several sensors that sense information about the surrounding environment of the vehicle 100.

For example, the sensing system 120 may include a positioning system 121 (for example, a GPS system, a BeiDou system, or another positioning system), an inertial measurement unit (inertial measurement unit, IMU) 122, a radar 123, a laser rangefinder 124, and a camera 125. The sensing system 120 may further include sensors in an internal system of the monitored vehicle 100 (for example, an air quality monitor, a fuel gauge, and an oil temperature gauge in the vehicle). Sensor data from one or more of these sensors may be used to detect an object and a corresponding feature (a location, a shape, a direction, a speed, or the like) of the object. The detection and identification are key functions for a safe operation of the autonomous vehicle 100.

The positioning system 121 may be configured to estimate a geographical location of the vehicle 100. The IMU 122 may be configured to sense a location change and a direction change of the vehicle 100 based on inertial acceleration. In an embodiment, the IMU 122 may be a combination of an accelerometer and a gyroscope.

For example, the radar 123 may sense an object in the surrounding environment of the vehicle 100 by using a radio signal. In some embodiments, in addition to sensing an object, the radar 123 may be further configured to sense a speed and/or a forward direction of the object.

For example, the laser rangefinder 124 may sense, by using a laser, an object in an environment in which the vehicle 100 is located. In some embodiments, the laser rangefinder 124 may include one or more laser sources, a laser scanner, one or more detectors, and another system component.

For example, the camera 125 may be configured to capture a plurality of images of the surrounding environment of the vehicle 100. For example, the camera 125 may be a static camera or a video camera.

As shown in FIG. 2, the control system 130 controls operations of the vehicle 100 and components of the vehicle 100. The control system 130 may include various elements, such as a steering system 131, a throttle 132, a braking unit 133, a computer vision system 134, a route control system 135, and an obstacle avoidance system 136.

For example, the steering system 131 may be operated to adjust a forward direction of the vehicle 100. For example, in an embodiment, the steering system 131 may be a steering wheel system. The throttle 132 may be configured to control an operation speed of the engine 111 and further control a speed of the vehicle 100.

For example, the braking unit 133 may be configured to control the vehicle 100 to decelerate. The braking unit 133 may slow down the wheel 114 by using friction. In another embodiment, the braking unit 133 may convert kinetic energy of the wheel 114 into current. The braking unit 133 may reduce a rotation speed of the wheel 114 by using another form, to control the speed of the vehicle 100.

As shown in FIG. 2, the computer vision system 134 may be operated to process and analyze an image captured by the camera 125 to identify an object and/or a feature in the surrounding environment of the vehicle 100. The object and/or feature may include a traffic signal, a road boundary, and an obstacle. The computer vision system 134 may use an object identification algorithm, a structure from motion (SFM) algorithm, video tracking, or another computer vision technology. In some embodiments, the computer vision system 134 may be configured to map an environment, track an object, estimate a speed of an object, and so on.

For example, the route control system 135 may be configured to determine a traveling route of the vehicle 100. In some embodiments, the route control system 135 may determine a traveling route for the vehicle 100 by combining data from a sensor, a GPS, and one or more predetermined map.

As shown in FIG. 2, the obstacle avoidance system 136 may be configured to get across a potential obstacle in an environment of the vehicle 100 through identification, evaluation, and avoidance, or in another manner.

In one instance, the control system 130 may additionally or alternatively include a component other than those shown and described, or some of the components shown above may be deleted.

As shown in FIG. 2, the vehicle 100 may interact with an external sensor, another vehicle, another computer system, or a user by using the peripheral device 140. The peripheral device 140 may include a wireless communications system 141, a vehicle-mounted computer 142, a microphone 143, and/or a speaker 144.

In some embodiments, the peripheral device 140 may provide means for the vehicle 100 to interact with the user interface 170. For example, the vehicle-mounted computer 142 may provide information to a user of the vehicle 100. The user interface 116 may further operate the vehicle-mounted computer 142 to receive input of the user. The vehicle-mounted computer 142 may be operated by using a touchscreen. In another case, the peripheral device 140 may provide means for the vehicle 100 to communicate with another device located in the vehicle. For example, the microphone 143 may receive audio (for example, a voice command or other audio input) from a user of the vehicle 100. Similarly, the speaker 144 may output the audio to the user of the vehicle 100.

As shown in FIG. 2, the wireless communications system 141 may wirelessly communicate with one or more devices directly or by using a communications network. For example, the wireless communications system 141 may be 3G cellular communication such as code division multiple access (code division multiple access, CDMA), EVDO, a global system for mobile communications (global system for mobile communications, GSM)/general packet radio service (general packet radio service, GPRS); or 4G cellular communication such as Long Term Evolution (long term evolution, LTE); or 5G cellular communication. The wireless communications system 141 may communicate with a wireless local region network (wireless local region network, WLAN) through wireless Internet access (WiFi).

In some embodiments, the wireless communications system 141 may directly communicate with a device using an infrared link, Bluetooth, or ZigBee (ZigBee), or may use other wireless protocols such as various vehicle communications systems. For example, the wireless communications system 141 may include one or more dedicated short range communications (dedicated short range communications, DSRC) devices, and these devices may include public and/or private data communication between vehicles and/or roadside stations.

As shown in FIG. 2, the power supply 160 may supply power to various components of the vehicle 100. In an embodiment, the power supply 160 may be a rechargeable lithium ion or lead-acid battery. One or more battery packets including such batteries may be configured to supply power to various components of the vehicle 100. In some embodiments, the power supply 160 and the energy source 113 may be implemented together, like in some battery electric vehicles.

For example, some or all of functions of the vehicle 100 may be controlled by the computer system 150. The computer system 150 may include at least one processor 151, and the processor 151 executes instructions 153 stored in, for example, a non-transient computer-readable medium in a memory 152. The computer system 150 may be a plurality of computing devices that control individual components or subsystems of the vehicle 100 in a distributed manner.

For example, the processor 151 may be any conventional processor, such as a commercially available CPU.

Optionally, the processor may be a dedicated device such as an ASIC or another hardware-based processor. Although FIG. 2 functionally illustrates a processor, a memory, and another element of a computer in a same block, a person of ordinary skill in the art should understand that the processor, the computer, or the memory may actually include a plurality of processors, computers, or memories that may or may not be stored in a same physical housing. For example, the memory may be a hard disk drive or another storage medium located in a place different from a housing of the computer. Therefore, reference to a processor or computer is understood as including reference to a set of processors or computers or memories that may or may not be operated in parallel. Unlike using a single processor to perform the steps described herein, some components, such as a steering component and a deceleration component, each may have its own processor, and the processor performs only calculation related to a component-specific function.

In the aspects described herein, the processor may be located far away from the vehicle and wirelessly communicate with the vehicle. In another aspect, some of the processes described herein are performed on a processor disposed in the vehicle, and the other processes are performed by a remote processor, including taking a necessary step to perform a single operation.

In some embodiments, the memory 152 may include the instructions 153 (for example, program logic), and the instructions 153 may be executed by the processor 151 to perform various functions of the vehicle 100, including those functions described above. The memory 152 may also include an additional instruction, for example, including an instruction used to send data to, receive data from, interact with, and/or control one or more of the traveling system 110, the sensing system 120, the control system 130, and the peripheral device 140.

For example, in addition to the instructions 153, the memory 152 may further store data, such as a road map, route information, a location, a direction, a speed, and other similar vehicle data of the vehicle, and other information. The information may be used by the vehicle 100 and the computer system 150 during operation of the vehicle 100 in an autonomous, semi-autonomous and/or manual mode.

As shown in FIG. 2, the user interface 170 may be configured to provide information to or receive information from a user of the vehicle 100. Optionally, the user interface 170 may include one or more input/output devices in a set of peripheral devices 140, such as the wireless communications system 141, the vehicle-mounted computer 142, the microphone 143, and the speaker 144.

In this embodiment of this application, the computer system 150 may control a function of the vehicle 100 based on input received from various subsystems (for example, the traveling system 110, the sensing system 120, and the control system 130) and the user interface 170. For example, the computer system 150 may use input from the control system 130 to control the braking unit 133 to avoid an obstacle detected by the sensing system 120 and the obstacle avoidance system 136. In some embodiments, the computer system 150 may be operated to provide control over many aspects of the vehicle 100 and the subsystem of the vehicle 100.

Optionally, one or more of the foregoing components may be separately installed or associated with the vehicle 100. For example, the memory 152 may be partially or completely separated from the vehicle 100. The foregoing components may be communicatively coupled together in a wired and/or wireless manner.

Optionally, the foregoing components are merely examples. In actual application, components in the foregoing modules may be added or deleted based on an actual requirement. FIG. 2 should not be understood as a limitation to this embodiment of this application.

Optionally, the vehicle 100 may be a self-driving vehicle traveling on a road, and may identify an object in a surrounding environment of the vehicle to determine adjustment to a current speed. The object may be another vehicle, a traffic control device, or another type of object. In some examples, each identified object may be considered independently, and a speed that needs to be adjusted for the self-driving vehicle may be determined based on features of the object, such as a current speed and acceleration of the object, spacing from the vehicle, and the like.

Optionally, the vehicle 100 or a computing device (for example, the computer system 150, the computer vision system 134, or the memory 152 in FIG. 2) associated with the vehicle 100 may predict a behavior of the identified object based on the features of the identified object and a status (for example, traffic, rain, or ice on a road) of the surrounding environment.

Optionally, identified objects all depend on behaviors of each other. Therefore, all the identified objects may be considered together to predict a behavior of a single identified object. The vehicle 100 can adjust a speed of the vehicle 100 based on the predicted behavior of the identified object. In other words, the self-driving vehicle can determine, based on the predicted behavior of the object, that the vehicle needs to be adjusted (for example, acceleration, deceleration, or stop) to a stable state. In this process, another factor may also be considered to determine a speed of the vehicle 100, such as a lateral location of the vehicle 100 on a traveling road, a curvature of the road, and proximity between a static object and a dynamic object.

In addition to providing instructions to adjust a speed of the self-driving vehicle, the computing device may further provide instructions to modify a steering angle of the vehicle 100, so that the self-driving vehicle follows a given track and/or maintains a safe lateral and longitudinal distance from an object (for example, a car in an adjacent lane on a road) near the self-driving vehicle.

The vehicle 100 may be a car, a truck, a motorcycle, a bus, a boat, a plane, a helicopter, a lawn mower, a recreational vehicle, an amusement park vehicle, a construction device, a tram, a golf cart, a train, a trolley, or the like. This is not specifically limited in this embodiment of this application.

For example, the method for identifying an object of interest of a user provided in this embodiment of this application may be further applied to another field, for example, the smart home device field. The identification method in this application may be used to improve accuracy of identifying a target gaze region by a user, to help a smart home device provide a more intelligent service to the user.

It should be understood that the foregoing is an example for describing an application scenario, and constitutes no limitation on the application scenario of this application.

Currently, in a method for detecting an object of interest, information about an object in a scenario usually needs to be obtained in advance. Further, an object gazed by a user in the scenario is determined based on line-of-sight tracking of the user, to determine an object of interest of the user. The method for detecting an object of interest relies on information about an object in a scenario. However, in many scenarios (for example, a driving scenario), information about an object in a current scenario cannot be obtained in advance. In this case, an object of interest of a user cannot be identified by using the method for detecting an object of interest, causing relatively poor user experience.

In view of this, this application provides a method and an apparatus for identifying an object of interest of a user. In the embodiments of this application, predetermining of an environment image may be introduced when an object of interest of a user is identified. To be specific, a target gaze region of the user, that is, a region in which a target object of interest of the user is located, is determined based on a sensitive region of the user and a line-of-sight-gazed region of the user that are in the environment image, thereby improving accuracy of identifying an object of interest of a user.

The method for identifying an object of interest of a user provided in this application is described below in detail with reference to FIG. 3 to FIG. 12.

Figure 3:
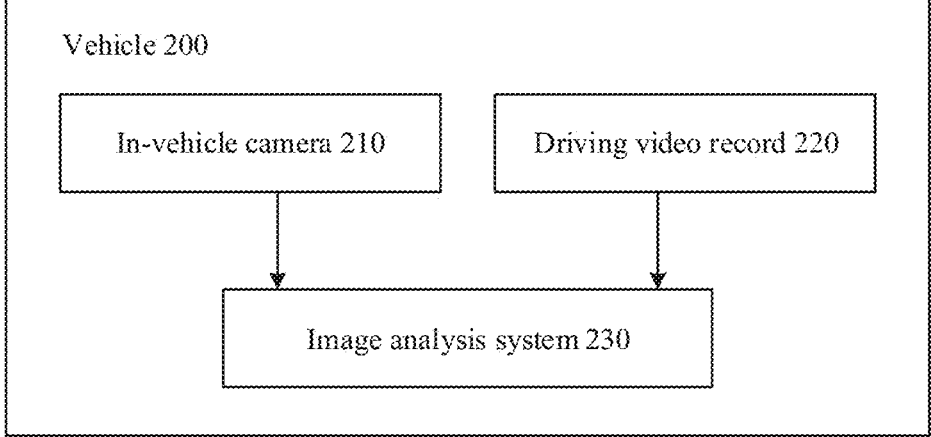
FIG. 3 is a schematic diagram of a hardware architecture of a vehicle according to an embodiment of this application.

FIG. 3 is a schematic diagram of a hardware architecture according to an embodiment of this application.

As shown in FIG. 3, a vehicle 200 may include an in-vehicle camera 210, a driving video record 220, and an image analysis system 230.

For example, the vehicle 200 may be a manually driven vehicle, or the vehicle 200 may be partially configured to be in a self-driving mode.

The in-vehicle camera 210 may be configured to detect a status of a user in the vehicle (for example, a driver or a passenger in the vehicle), for example, may perform driver fatigue monitoring, driver expression identification, and driver eyeball positioning; or perform eyeball positioning of a passenger in the vehicle, expression identification of a passenger in the vehicle.

For example, the in-vehicle camera 210 is a camera configured in a driver monitoring system (driver monitoring system, DMS) of the vehicle 200 or a camera in a cockpit monitoring system (cockpit monitoring system, CMS). A location of the camera may be near an A-pillar (A-pillar) of the vehicle 200, or may be a location of a steering wheel or a dashboard, a location near a rear-view mirror, or the like.

The driving video record 220 may be configured to record a video image and sound information in a traveling process of the vehicle.

For example, the driving video record 220 is a driving video record camera configured in the front of a vehicle body of the vehicle 200.

The image analysis system 230 may be configured to process and analyze an image captured by the in-vehicle camera 210 or the driving video record 220, to identify line-of-sight tracking of the user in the vehicle 200 for an object outside the vehicle.

It should be understood that the hardware architecture shown in FIG. 3 is an example for description, and the vehicle 200 may further include another component required for implementing normal running.

Figure 4:
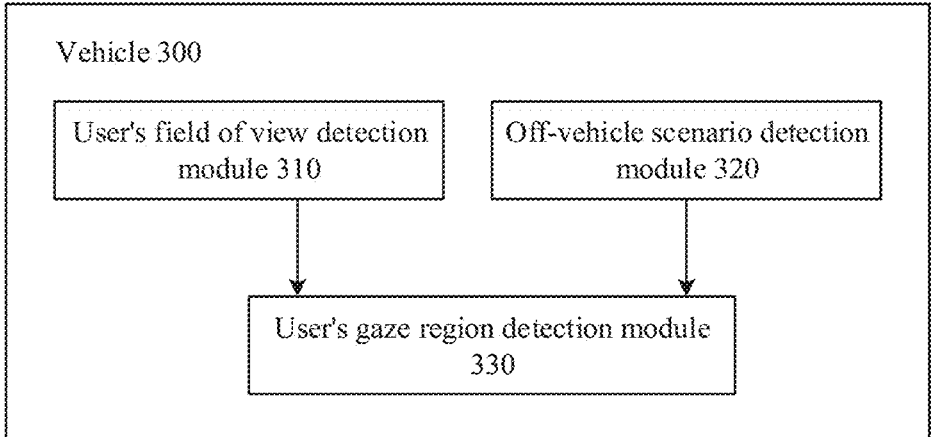
FIG. 4 is a schematic diagram of a software architecture of a vehicle according to an embodiment of this application.

FIG. 4 is a schematic diagram of a software architecture according to this application.

As shown in FIG. 4, a vehicle 300 may include a user's field of view detection module 310, an off-vehicle scenario detection module 320, and a user's gaze region detection module 330.

The user's field of view detection module 310 is configured to detect a line-of-sight-gazed region of a head of a user in the vehicle, for example, a line-of-sight-gazed region of a head of a driver, that is, a location of a region through which a line-of-sight of the driver passes on a front windshield, or a line-of-sight-gazed region of a head of a passenger in the vehicle.

The off-vehicle scenario detection module 320 is configured to detect an object in an off-vehicle scenario, and predetermine, based on this physiological feature of a human body, a specific object that is outside the vehicle and in the user has an interest or a sensitive region in the object.

The user's gaze region detection module 330 is configured to determine a target gaze region of the user, that is, a region in which a target object that is outside the vehicle and in which the user has an interest is located, based on results of the user's field of view detection module 310 and the off-vehicle scenario detection module 320.

It should be understood that the software architecture shown in FIG. 4 is an example for description, and the vehicle 300 may further include a software module required for implementing normal running.

The method for identifying an object of interest of a user provided in this application is described below in detail with reference to FIG. 5.

It should be understood that the identification method shown in FIG. 5 may be performed by the traveling vehicle shown in FIG. 1 or the intelligent terminal shown in FIG. 2. The traveling vehicle may be the vehicle shown in FIG. 3 or the vehicle shown in FIG. 4.

The identification method 400 shown in FIG. 5 includes step S410 to step S430, and these steps are separately described below in detail.

S410: Obtain information about a line-of-sight-gazed region of a user and an environment image corresponding to the user.

For example, in the intelligent vehicle field, information about a line-of-sight-gazed region of a user in the vehicle may be obtained by using a camera in a DMS or a camera in a CMS. For example, a facial image of a driver may be collected by using the camera in the DMS, and a line-of-sight-gazed region of the driver's head may be determined based on the facial image of the driver. Further, the environment image may be obtained by using a driving video record in the vehicle. For example, an image of an environment outside the vehicle during driving of the vehicle may be obtained by using the driving video record, or an image of an environment outside the vehicle during driving of the vehicle may be obtained from a cloud.

For example, after the camera in the DMS or the camera in the CMS in the vehicle obtains the information about the line-of-sight-gazed region of the user and the driving video record obtains the environment image, the information and the environment image may be sent to a computer system (for example, a vehicle-mounted device) of the vehicle by using a communications system.

The communications system may be 3G cellular communication such as CDMA, EVDO, or GSM/GPRS, 4G cellular communication such as LTE, or 5G cellular communication. The communications system may communicate with a wireless local region network through wireless Internet access (WiFi). Alternatively, the communications system may directly communicate with a device by using an infrared link, Bluetooth, or ZigBee (ZigBee); the communications system may use other wireless protocols such as various vehicle communications systems; or the communications system may include one or more dedicated short range communications devices, and these devices may include public and/or private data communication between vehicles and/or roadside stations.

It should be noted that the environment image corresponding to the user may be an image of an environment in which the user is located. The information about the line-of-sight-gazed region of the user may include location information of the line-of-sight-gazed region of the user, a direction of the line-of-sight-gazed region of the user, a range of the line-of-sight-gazed region of the user, and the like.

For example, in the driving field, the user may be a driver of a vehicle or may be a passenger in the vehicle, and the environment image corresponding to the user may be an image of an environment in which the vehicle is located or an image of an environment outside the vehicle. The vehicle may be a manually driven vehicle or a vehicle completely or partially configured to be in a self-driving mode.

For example, in the smart home device field, the user may be a user of a smart home device in a home, and the environment image corresponding to the user may be an image of the home in which the user of the smart home device is located.

It should be understood that the foregoing is an example for describing the environment image corresponding to the user, and this is not limited in this application.

S420: Obtain information about a first gaze region of the user in the environment image based on the environment image.

The first gaze region is a sensitive region determined by using a physical feature of a human body.

It should be understood that the first gaze region in the environment image is a sensitive region of the user determined by using a biological feature of a human body, but is unnecessarily a gaze region of the user. The sensitive region may be a region that easily draws attention of the user and that is determined based on a physical feature of the human body, for example, a degree of sensitivity of a human eye to different colors and a shape change.

For example, photosensitivity of a visual nerve of a human eye to various different wavelengths of light is different. The human eye is most sensitive to an electromagnetic wave whose wavelength is about 555 nm. The electromagnetic wave is located in a green light region of a spectrum, so that the human eye is relatively sensitive to green light. Therefore, a sensitive region of a user in an image may be a green region in the image.

For example, the first gaze region in the environment image may be represented by using an interest value of each region in the image. The interest value may be obtained as follows: Form change richness is obtained by using a deep learning method or an edge detection method, color change richness is obtained by using a gradient calculation method, and weighting calculation is performed on the two values to obtain the interest value at each location in the image. It is predetermined, based on the interest value at each location in the image, a specific region to which a driver is relatively sensitive in the image and that easily draws attention of the user. For details, refer to subsequent FIG. 10.

For example, a Canny edge detection algorithm is described. The Canny edge detection algorithm may be divided into the following five steps.

Step 1: Perform smoothing processing on the environment image through Gaussian filtering, to remove noise from the environment image.

Step 2: Determine intensity gradients (intensity gradients) in the environment image.

Step 3: Eliminate edge misdetection (for example, an original non-edge is detected as an edge) by using a non-maximum suppression (non-maximum suppression) technology.

Step 4: Determine a possible (potential) boundary in the environment image by using a dual threshold method.

Step 5: Track the boundary in the environment image by using a lag technology.

S430: Obtain a target gaze region of the user based on the information about the line-of-sight-gazed region of the user and the information about the first gaze region.

The target gaze region is used to indicate a region in which a target object gazed by the user in the environment image is located.

For example, the target object gazed by the user may be a target object of interest of the user. An object of interest of the user may be determined by collecting historical behavior data of the user to obtain interest values of the user for different objects; or may be determined by collecting labels made by the user for different objects.

It should be understood that the first gaze region may be a sensitive region of the user that is in the environment image and that is predetermined in advance based on a physical feature of a human body. The target gaze region is the region in which the target object in which the user has an interest in the environment image is located. First gaze regions for different users may be the same. However, for different users, target gaze regions may be regions in which objects in which the users have an interest and at which the users gaze based on their own interests in the environment image are located.

In this embodiment of this application, predetermining of an environment image may be introduced when an object of interest of a user is identified. To be specific, a target gaze region of the user is determined based on a region to which the user may be sensitive in the environment image and a line-of-sight-gazed region of the user, thereby improving accuracy of identifying an object of interest of a user.

Further, when the identification method is applied to a scenario of the intelligent vehicle field, the identification method further includes: displaying information about the target gaze region on a display of the vehicle. In an example, the user may be a driver of the vehicle or may be a passenger in the vehicle. The vehicle may detect identity information of the user. For example, the vehicle determines, based on location information of the user in the vehicle, that the user is a driver or a passenger; and may further push the information about the target gaze region to the user based on the identity information of the user. For example, the information about the target gaze region may be displayed on a display at a corresponding location, or the information about the target gaze region may be broadcast, or the information about the target region may be pushed to a mobile phone of the user, so that the user can subsequently continue to learn of the information about the target gaze region.

For example, if it is detected that the user is a driver, the information about the target gaze region may be displayed in the vehicle by using a head-up display (head up display, HUD), for example, the information about the target gaze region may be displayed on a front windshield.

For example, if it is detected that the user is a passenger in a front passenger's seat or in a back seat in the vehicle, the information about the target gaze region may be displayed on a display corresponding to the location.

Optionally, in a possible implementation, the obtaining a target gaze region of the user based on the information about the line-of-sight-gazed region of the user and the information about the first gaze region may include: determining the target gaze region of the user based on an overlapping region between the line-of-sight-gazed region of the user and the first gaze region.

In an example, the method for identifying an object of interest of a user may be applied to a driving scenario. In this case, the user may be a user located inside a vehicle (for example, a user in the vehicle). The obtaining information about a line-of-sight-gazed region of a user and an environment image corresponding to the user may include: obtaining information about a line-of-sight-gazed region of the user in the vehicle and an image of a driving video record in the vehicle, where the line-of-sight-gazed region of the user in the vehicle is used to indicate a gaze region that is of the user in the vehicle and that is outside the vehicle. The obtaining a target gaze region of the user based on the information about the line-of-sight-gazed region of the user and the information about the first gaze region includes: determining the target gaze region of the user in the vehicle based on the information about the line-of-sight-gazed region of the user in the vehicle and the information about the first gaze region in the image of the driving video record.

In one example, if the user in the vehicle is a driver of the vehicle, the line-of-sight-gazed region of the driver is used to indicate a gaze region of the driver in a front windshield direction of the vehicle.

In another example, if the user in the vehicle is a passenger in the vehicle, for example, a passenger in a front passenger's seat, the line-of-sight-gazed region of the user is used to indicate a gaze region of the passenger in a front windshield direction of the vehicle or a gaze region in a vehicle window direction of the vehicle.

For example, in the driving scenario, the target gaze region of the user may be a region in which an object of interest of the driver in a scenario outside the vehicle is located, for example, may be a billboard on a roadside.

It should be noted that for a specific procedure of the method for identifying an object of interest of a user in the driving scenario, refer to subsequent FIG. 6 to FIG. 11.

Optionally, in a possible implementation, the obtaining information about a line-of-sight-gazed region of the user in the vehicle and an image of a driving video record in the vehicle may include: obtaining information about line-of-sight-gazed regions of the user in the vehicle in N frames of images and N frames of images of the driving video record. The determining the target gaze region of the user in the vehicle based on the information about the line-of-sight-gazed region of the user in the vehicle and the information about the first gaze region in the image of the driving video record may include: determining that a difference between the line-of-sight-gazed regions of the user in the vehicle in the N frames of images meets a first preset range; determining that a difference between the first gaze regions in the N frames of images of the driving video record meets a second preset range; determining an overlapping region based on the line-of-sight-gazed regions of the user in the vehicle in the N frames of images and the first gaze regions in the M frames of images of the driving video record; and determining the target gaze region of the user in the vehicle based on the overlapping region.

For example, the difference between the line-of-sight-gazed regions of the driver in the N frames of images may be a location difference between the line-of-sight-gazed regions of the driver in a plurality of frames of images, or may be a size difference between the line-of-sight-gazed regions of the driver in a plurality of frames of images. It can be determined, by using the difference between the line-of-sight-gazed regions in the N frames of images, whether the driver continuously gazes at a same target object in preset time.

Likewise, the difference between the first gaze regions in the N frames of images of the driving video record may be a location difference between the first gaze regions in a plurality of frames of images of the driving video record, or may be a size difference between the first gaze regions in a plurality of frames of images of the driving video record in a plurality of frames. It can be determined, by using the difference between the first gaze regions in the M frames of images of the driving video record, whether the user in the vehicle can see a target object in the environment image in preset time, to avoid a scenario in which a traveling direction of the vehicle suddenly changes, and the user in the vehicle may gaze at the target object outside the vehicle but cannot continue to gaze at the target object.

It should be noted that the obtained N frames of images may be obtained N frames of images of the driver, and the N frames of images of the driver and the M frames of images of the driving video record are images obtained in a same time period, that is, images obtained from a same start moment to a same end moment.

For example, when the N frames of images of the driver or the M frames of images of the driving video record are obtained, a processor in the vehicle may mark a time stamp on the image, and it may be determined, based on the time stamp, the N frames of images of the driver and the M frames of images of the driving video record that are obtained in a same time period.

It should be understood that the obtained N frames of images of the driver and the obtained M frames of images of the driving video record may be images obtained in an allowed time difference range. In other words, a moment at which the N frames of images of the driver are obtained is similar or close to a moment at which the M frames of images of the driving video record are obtained.

For example, if there is a specific allowed time difference between the obtained N frames of images of the driver and the obtained M frames of images of the driving video record, several subsequent frames of images of the driver may be predicted based on the obtained N frames of images of the driver, or several subsequent frames of images of the driving video record may be predicted based on the M frames of images of the driving video record.

For example, the line-of-sight-gazed regions of the driver in the obtained N frames of images may be N frames of images of the driver that are collected by using a camera configured in a vehicle cab. The line-of-sight-gazed regions of the driver in the N frames of images may be determined based on the N frames of images of the driver. For example, a gaze region of the driver on a front windshield of the vehicle may be determined based on heat locations of the driver in the N frames of images of the driver.

It should be understood that, the overlapping region between the line-of-sight-gazed regions of the driver in the N frames of images and the first gaze regions in the M frames of images of the driving video record is further determined only when the difference between the line-of-sight-gazed regions of the driver in the N frames of images meets the first preset range and the difference between the first gaze regions in the N frames of images of the driving video record meets the second preset range. For example, when the first preset range and the second preset range are met, a size of the overlapping region may be determined based on the line-of-sight-gazed region of the driver in the $i^{th}$ frame of image in the line-of-sight-gazed regions of the driver in the N frames of images and the first gaze region in the $i^{th}$ frame of image of the driving video record in the M frames of images of the driving video record. The target gaze region of the driver is determined by comparing overlapping regions in the N frames of images.

In this embodiment of this application, a line-of-sight of the driver may be first tracked. To be specific, it is determined that a difference between the obtained N frames of images, namely, N frames of images of the driver, meets the first preset range, that is, it may be determined that line-of-sight-gazed regions of the driver in the obtained N frames of images of the driver are not directly in the front and a change difference between the line-of-sight-gazed regions in the N frames of images remains relatively small. In this case, it may be determined that the driver gazes at an object of interest in a scenario outside the vehicle. In addition, it is determined that the difference between the obtained M frames of images of the driving video record meets the second preset range. In this case, it may be determined that a same object continuously photographed by the driving video record in a plurality of frames is not lost. In this case, an overlapping region between the line-of-sight-gazed regions of the driver in the N frames of images and the M frames of images of the driving video record is further determined, to determine a target gaze region of the driver. A plurality of frames of images meet the first preset range and the second preset range, to ensure robustness of the method for identifying an object of interest of a user provided in this application.

It should be further understood that from a same start moment to a same end moment, a quantity of obtained N frames of images (for example, the N frames of images of the driver) may be the same as or different from a quantity of obtained M frames of images of the driving video record.

In one case, from a same start moment to a same end moment, the quantity of obtained N frames of images (that is, the images of the driver) may be equal to the quantity of obtained M frames of images of the driving video record.

For example, the line-of-sight-gazed regions of the driver in the N frames of images may be gaze regions of the driver in three frames of images: an image #1 to an image #3; and the M frames of images of the driving video record may be three frames of images of the driving video record, which are respectively an image #4 to an image #6, that correspond to the line-of-sight-gazed regions of the driver in the three frames of images. In this case, the determining the overlapping region based on the line-of-sight-gazed regions of the driver in the N frames of images and the first gaze regions in the N frames of images of the driving video record may mean determining an overlapping region, which is denoted as an overlapping region 1, between the gaze region of the driver in the image #1 and the first line-of-sight-gazed region in the image #4 of the driving video record. Likewise, the following overlapping regions are separately obtained: an overlapping region between the image #2 and the image #5 of the driving video record, which is denoted as an overlapping region 2, and an overlapping region between the image #3 and the image #6 of the driving video record, which is denoted as an overlapping region 3. The target gaze region of the driver is finally obtained by using a same part in the overlapping region 1, the overlapping region 2, and the overlapping region 3.

In another case, from a same start moment to a same end moment, the quantity of obtained N frames of images (that is, the images of the driver) is unequal to the quantity of obtained M frames of images of the driving video record. For example, if a collection frequency of a camera for obtaining an image of the driver is different from a collection frequency of the driving video record, quantities of image frames collected in a same time period may be different.

For example, that N frames of images of the driver and M frames of images of the driving video record are obtained is used as an example for description, where N<M.

1. Downward matching is performed. To be specific, matching is performed for images whose quantity is relatively small, that is, matching is performed for the N frames of images of the driver.

For example, for each of the N frames of images of the driver, an image of the driving video record whose time stamp is closest to that of the frame of image of the driver is found from the M frames of images of the driving video record, that is, N frames of images of the driving video record is found from the M frames of images of the driving video record based on the N frames of images of the driver. In other words, some redundant images in the M frames of images of the driving video record are allowed to be discarded.

2. Upward matching is performed. To be specific, matching is performed for images whose quantity is relatively large, that is, matching is performed for the M frames of images of the driving video record.

For example, for each of the M frames of images of the driving video record, a driver image whose time stamp is closest to that of the frame of image of the driving video record is found from the N frames of images of the driver, that is, M frames of images of the driver are found based on the M frames of images of the driving video record. In other words, some driver images are allowed to be reused, that is, a plurality of images in the M frames of images of the driving video record are allowed to match a same driver image.

Likewise, when N>M, a process is similar to the foregoing process, and details are not described herein again.

Further, in this embodiment of this application, to help determine an overlapping region, that is, an overlapping part, between the line-of-sight-gazed region of the user in the vehicle and the first gaze region in the environment image, images located on two imaging planes may be projected onto a same imaging plane. To be specific, the information about the line-of-sight-gazed region of the user in the vehicle may be mapped to an imaging plane on which the image of the driving video record is located, or information about the image of the driving video record may be mapped to an imaging plane on which the line-of-sight-gazed region of the user in the vehicle is located. For a specific process, refer to subsequent FIG. 9.

Optionally, in a possible implementation, the identification method further includes: displaying information about the target gaze region on a display of the vehicle.

Optionally, in a possible implementation, the vehicle may include a plurality of displays, and the displaying information about the target gaze region on a display of the vehicle includes: determining a target display in the plurality of displays based on location information that is of the user in the vehicle and that is in the vehicle; and displaying the information about the target gaze region on the target display.

For example, identity information of the user is determined based on the location information of the user in the vehicle, and the identity information may include a driver or a passenger. Further, the information about the target gaze region may be pushed to the user based on the identity information of the user. For example, the information about the target gaze region may be displayed on a display at a corresponding location, or the information about the target gaze region may be broadcast, or the information about the target region may be pushed to a mobile phone of the user, so that the user can subsequently continue to learn of the information about the target gaze region.

For example, if it is detected that the user is a driver, the information about the target gaze region may be displayed in the vehicle by using a head-up display HUD system, for example, the information about the target gaze region may be displayed on a front windshield.

For example, if it is detected that the user is a passenger in a front passenger's seat or in a back seat in the vehicle, the information about the target gaze region may be displayed on a display corresponding to the location.

Optionally, in a possible implementation, the identification method further includes: displaying the information about the target gaze region in the vehicle by using a head-up display HUD system.

In another example, the method for identifying an object of interest of a user may be applied to an intelligent terminal scenario. In the intelligent terminal scenario, the method provided in this application may be used to identify an object of interest of a user, to provide a more intelligent service for the user, thereby effectively improving user experience. For a specific procedure, refer to subsequent FIG. 12. Details are not described herein.

In this embodiment of this application, predetermining of an environment image may be introduced when an object of interest of a user is identified. To be specific, a region in which the user actually has an interest is determined based on a region in which the user may have an interest in the environment image and a line-of-sight-gazed region of the user, thereby improving accuracy of identifying an object of interest of a user.

FIG. 6 is a schematic flowchart of a method for identifying an object of interest of a user according to an embodiment of this application. The method shown in FIG. 6 includes step S510 to step S560, and these steps are separately described below in detail.

It should be understood that the method shown in FIG. 6 may be performed by the traveling vehicle shown in FIG. 1 or the intelligent terminal shown in FIG. 2. The traveling vehicle may be the vehicle shown in FIG. 3 or the vehicle shown in FIG. 4.

It should be noted that FIG. 6 is described by using an example in which a user is a driver. In this embodiment of this application, the user may be a user located in a vehicle, for example, a passenger in the vehicle; or may be a user of another identity. This is not limited in this application.

S510: Calculate a line-of-sight-gazed region of the driver.

The calculating a line-of-sight-gazed region of the driver is determining a location of a region through which a line-of-sight of the driver passes on a front windshield.

For example, an image collected by a DMS/CMS may be input to a computing system for calculation, and a region gazed by the driver on the front windshield is obtained by using a depth learning algorithm or a support vector machine algorithm.

It should be noted that the support vector machine (Support vector machines, SVM) algorithm is a supervised machine learning algorithm that can be used for task classification or task regression.

Figure 7:
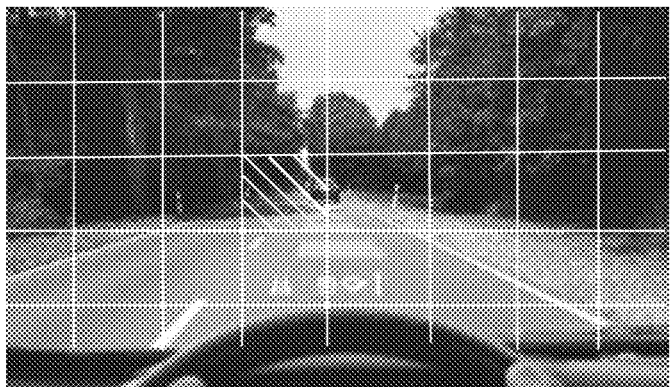
FIG. 7 is a schematic diagram of a line-of-sight-gazed region of a driver according to an embodiment of this application.

For example, as shown in FIG. 7, the front windshield may be divided into a plurality of square regions. It is assumed that a lower left corner is a start point, and coordinates of the start point in the region are (0, 0). "Upward" and "rightward" are corresponding positive directions. Line-of-sight-gazed regions of the driver in the plurality of square regions may be identified by using the depth learning algorithm.

S520: Calculate a 3D location of the driver's head.

For example, the 3D location of the driver's head may be calculated by using a binocular stereo vision method.

Figure 8:
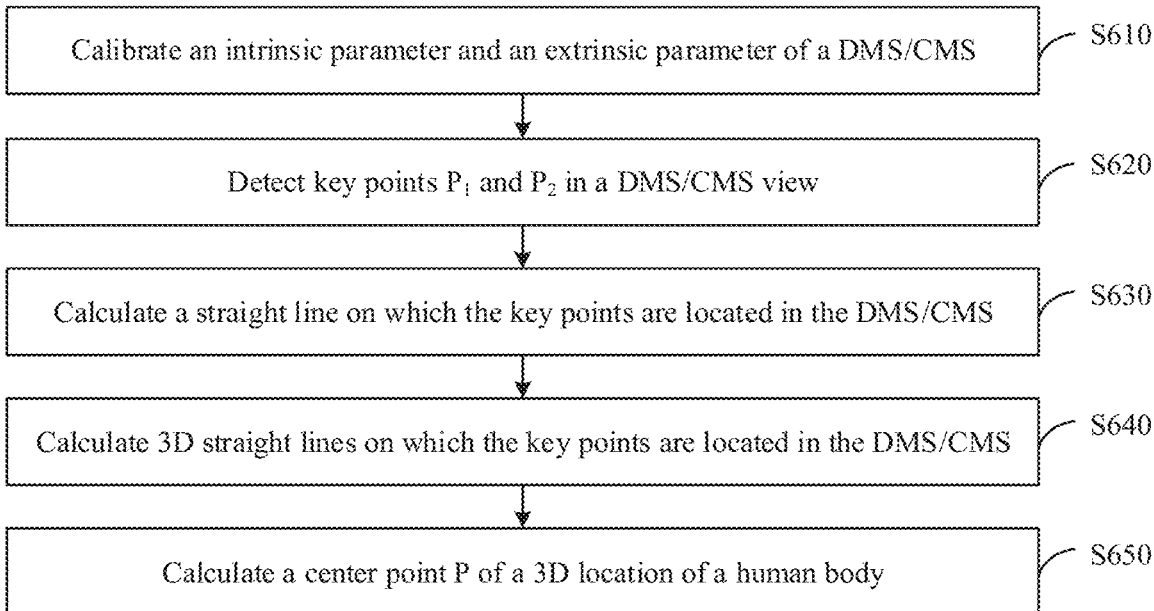
FIG. 8 is a schematic flowchart of calculating a head location of a driver according to an embodiment of this application.

For example, FIG. 8 is a schematic flowchart of calculating a 3D location of a driver's head. As shown in FIG. 8, the method includes step S610 to step S650, and these steps are separately described below in detail.

S610: Obtain calibration for an intrinsic parameter and an extrinsic parameter of a camera.

For example, obtaining calibration for an intrinsic parameter or an extrinsic parameter of the DMS/CMS before delivery may be obtaining intrinsic parameter matrices and extrinsic parameter matrices of the two cameras by using a camera calibration method. Therefore, a location and direction relationship between the cameras and between the camera and another object in 3D space can be established based the intrinsic parameter and the extrinsic parameter.

S620: Detect key points P1 and P2.

The key points P1 and P2 may be respectively center locations of the driver's head in a DMS or CMS view.

For example, detecting the head locations P1, P2 in the DMS/CMS view may be detecting 2D horizontal and vertical coordinate locations p1 and p2 of the head in the two views through depth learning or another algorithm.

S630: Calculate a straight line on which the key points P1 and P2 are located.

S640: Calculate 3D straight lines O1P1 and O2P2 on which the key points P1 and P2 are located.

For example, the 3D straight lines O1P1 and O2P2 on which the head is located may be calculated based on the intrinsic parameter/extrinsic parameter of the DMS/CMS. The 2D horizontal and vertical coordinates p1 and p2 of the head may be converted into 3D spatial coordinates P1 and P2 based on the intrinsic parameter/extrinsic parameter of the camera. O1 and O2 respectively represent optical origins of the DMS/CMS in 3D space, and are recorded in the extrinsic parameter matrix, so that O1P1 and O2P2 can be calculated.

S650: Calculate a center location point P of the driver's head.

For example, the location point P in the driver's head may be obtained by solving an intersection point of the two 3D lines O1P1 and O2P2. If the two straight lines O1P1 and O2P2 have no intersection point, a point closest to the two straight lines may be selected as the point P.

Through S610 to S650, the 3D location of the driver's head may be obtained based on the intrinsic parameter and the extrinsic parameter of the camera.

S530: Calculate a line-of-sight-gazed region in a driving video record (driving video record, DVR).

It should be noted that the calculating a line-of-sight-gazed region in a DVR may mean establishing an association relationship between a line-of-sight-gazed region of a driver on a windshield and the line-of-sight-gazed region of the DVR. For example, the association relationship may be a table lookup relationship.

Figure 9:
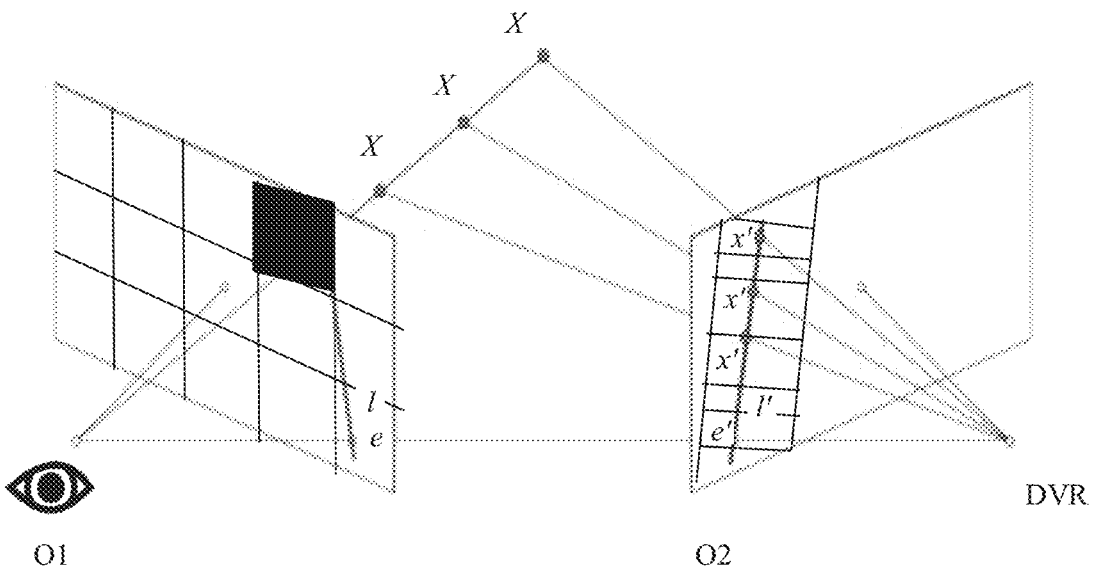
FIG. 9 is a schematic diagram of calculating a line-of-sight-gazed region of in a DVR according to an embodiment of this application.

For example, FIG. 9 shows a spatial location relationship between an image plane O1 of the driver and an image plane O2 of the DVR. The driving video record installed in the front of a vehicle body obtains an image of the front, and then a region that is in the DVR and that corresponds to a gaze region of the driver is calculated based on a location of the driver's head and the line-of-sight-gazed region of the driver. An eye point is a location of a rear-view camera on the vehicle body, a line X is an extended line of a center point of the line-of-sight-gazed region of the driver in space, the DVR is a location of the driving video record in space, a shaded region in O1 represents a gaze region of the driver on a windshield, and a region with a slash in O2 represents a corresponding gaze region of the driver in a DVR view.

It should be understood that a location of an object of interest of the driver is located on an extended line that passes through a line-of-sight-gazed region of the driver on a front windshield. Therefore, the corresponding gaze region of the driver in the DVR view is determined, so that a region in which the object of interest of the driver is roughly located in the DVR can be determined.

S540: Predetermine scenario attention.

It should be noted that scenario attention predetermining means the following: A human eye is relatively sensitive to and has an interest in a region with relatively rich color and shape changes. Therefore, based on this physiological feature of a human body, it may be predetermined a specific region that is outside the vehicle and in which the driver may have an interest.

Figure 10:
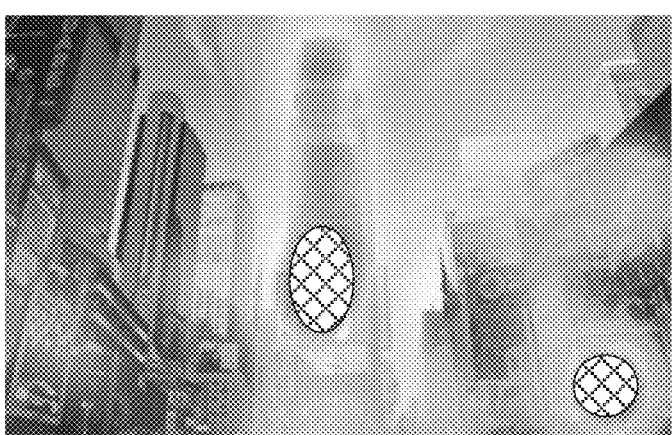
FIG. 10 is a schematic diagram of a scenario attention predetermining according to an embodiment of this application.

For example, as shown in FIG. 10, an image is obtained. Form change richness is obtained by using a depth learning method or a Canny edge detection method, color change richness is obtained by using a gradient calculation method, and weighting calculation is performed on the two values to obtain an interest value at each location in the image. It is predetermined, based on the interest value at each location in the image, a specific region in which the driver may have an interest in the image. For example, a shaded region in FIG. 10 represents a sensitive region of the driver, that is, a region that may draw attention of the driver.

For example, the image may be an image obtained from the DVR.

S550: Determine a scenario attention region.

For example, a region in which the driver really has an interest in a scenario outside the vehicle may be obtained by calculating a corresponding line-of-sight-gazed region of the driver in the DVR and predetermining scenario attention.

S560: Determine an intention.

For example, based on scenario attention region determining in S550, a region in which the driver really has an interest may be obtained, so that information about the region can be obtained. Subsequently, the information of interest may be provided to the driver. For example, the information about the region of interest may be broadcast to the driver, or the information may be pushed to a mobile phone of the driver, so that the driver can subsequently continue to learn of the information about the region of interest.

Figure 11:
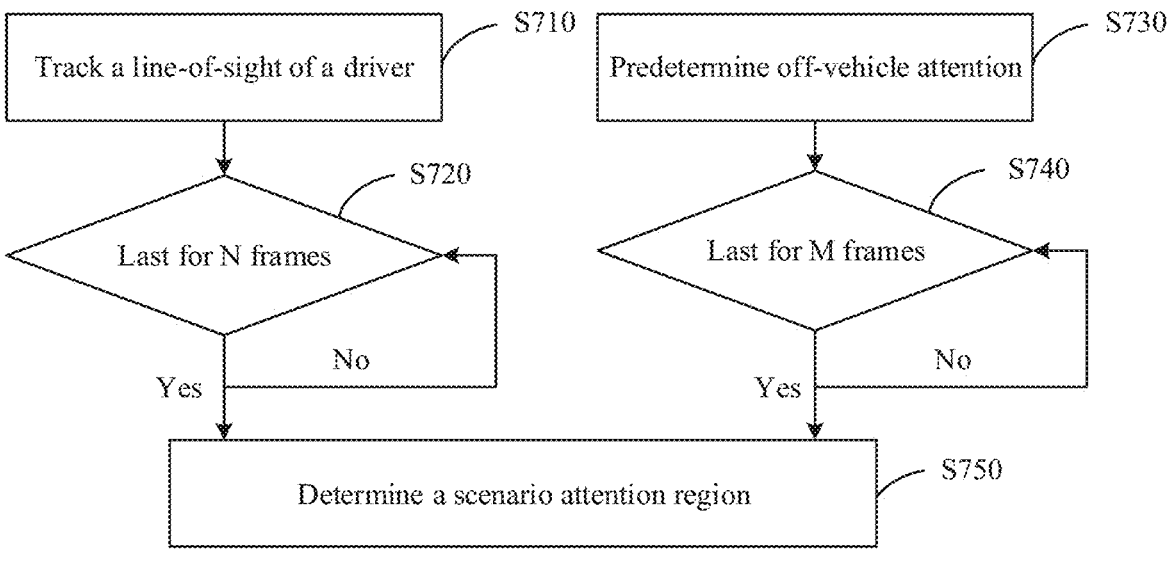
FIG. 11 is a schematic flowchart of scenario attention region determining in the driving field according to an embodiment of this application.

For example, for a specific procedure of scenario attention region determining, refer to a procedure shown in FIG. 11. Scenario attention region determining may include step S710 to step S750, and these steps are separately described below in detail.

S710: Track a line-of-sight of a driver.

For example, for details, refer to S510 of calculating a line-of-sight-gazed region of a driver.

S720: Determine whether a line-of-sight-gazed region of the driver lasts for N frames; and perform S750 if the line-of-sight-gazed region of the driver lasts for N frames; or go back if the line-of-sight-gazed region of the driver does not last for N frames.

It should be noted that the determining whether a line-of-sight-gazed region of the driver lasts for N frames means determining whether a line-of-sight-gazed region of the driver on a front windshield remains unchanged or changes in a small range in N frames of images, that is, determining whether the driver continuously pays attention to a specific region in consecutive N frames.

For example, if a change of the line-of-sight-gazed region of the driver in the N frames exceeds a range, it may be considered that the driver merely throws a glance and attention of the driver is not drawn. In this state, a region of interest of the driver outside a vehicle does not need to be calculated. Alternatively, if the line-of-sight-gazed region of the driver is always directly in the front, it may be considered that the driver concentrates on driving and does not gaze at an object or the like outside the vehicle. In this state, the region of interest of the driver outside the vehicle does not need to be calculated.

It should be understood that in this embodiment of this application, whether the line-of-sight-gazed region of the driver remains unchanged or change in a small range in the N frames of images may mean that the line-of-sight-gazed region of the driver remains unchanged or change in a small range in the N frames of images except in the direct front of the line-of-sight-gazed region of the driver. The direct front may be a traveling direction of the vehicle.

S730: Predetermine off-vehicle attention.

For example, for details, refer to S540 of predetermining scenario attention.

S740: Determine whether off-vehicle attention predetermining lasts for M frames; and perform S750 if off-vehicle attention predetermining lasts for M frames; or go back if off-vehicle attention predetermining does not last for M frames.

It should be understood that off-vehicle attention predetermining is performed in consecutive M frames is performing attention predetermining on an image obtained by a driving video record to calculate an overlapping region between regions of interest in a plurality of images.

For example, if the region of interest is lost from the M frames of images, that is, the region of interest moves out of an image boundary, or the regions of interest in the plurality of frames of images are discontinuous, a possible corresponding scenario may be a relatively small object on a roadside (for example, a small billboard on the roadside) in a driving process. Gaze time of the driver is relatively short, and it is basically impossible to cause interest of the driver, and therefore S750 does not need to be performed. If the regions of interest in the M frames of images are continuous and are not lost, S750 may be performed to predetermine whether this region is a real region of interest of the driver.

It should be further understood that from a same start moment to a same end moment, a quantity of obtained N frames of images (for example, the N frames of images of the driver) may be the same as or different from a quantity of obtained M frames of images of the driving video record.

S750: Determine a scenario attention region.

It should be noted that S750 is based on a driver's line-of-sight tracking algorithm and an off-vehicle attention predetermining algorithm. When results of the two algorithms continuously remain unchanged or change in a small range, a procedure of scenario attention region determining is enabled. In other words, if both the line-of-sight-gazed region of the driver and off-vehicle attention predetermining continuously remain unchanged or change in a small range in consecutive N frames of images, off-vehicle scenario attention region determining needs to be performed.

For example, it is assumed that N frames of images (for example, five frames of images) of the driver are obtained by using a camera in a vehicle cab, and that N frames of images (for example, five frames of images) of an off-vehicle scenario may be obtained by using the driving video record. Line-of-sight-gazed regions of the driver on the front windshield in the five frames of images collected by the camera in the cab are separately calculated, and it is further determined whether the line-of-sight-gazed region of the driver remains unchanged or change in a relatively small range in the five frames of images. Likewise, regions in which the driver may have an interest in the five frames of images of the off-vehicle scenario may be separately determined based on off-vehicle attention predetermining, and it is further determined whether the regions in which the driver may have an interest in the five frames of images of the off-vehicle scenario remain unchanged or change in a relatively small range. If it is simultaneously met that the foregoing two consecutive N frames remain unchanged or change in a relatively small range, an overlapping region between each of the N frames of images of the driver obtained by the camera in the cab and each corresponding obtained frame of image of the driving video record is determined, where the overlapping region is a real region of interest of the driver.

It should be understood that, the foregoing is described by using an example in which in a same time period, a quantity of images collected in the vehicle cab is equal to a quantity of images of the driving video record. In a same time period, a quantity of images collected in the vehicle cab may be different from a quantity of images of the driving video record. This is not limited in this application.

For example, a line-of-sight-gazed region of the DVR may be calculated by using S530. To be specific, the line-of-sight-gazed region of the driver is moved from a windshield to the image of the driving video record, and an intersection of the line-of-sight-gazed region of the driver in the image of the driving video record and a predetermined region of interest in the image of the driving video record is obtained. When an intersection of consecutive N frames of images remains unchanged or move in a small range, it is considered that the intersection region is a region really gazed by the driver.

In this embodiment of this application, the line-of-sight-gazed region of the driver is obtained with reference the image of the driver obtained by the in-vehicle camera, and the line-of-sight-gazed region of the driver is combined with an off-vehicle scenario region, thereby improving accuracy and robustness of an algorithm for identifying an object of interest of a user, and bringing better interaction experience to the user.

Figure 12:
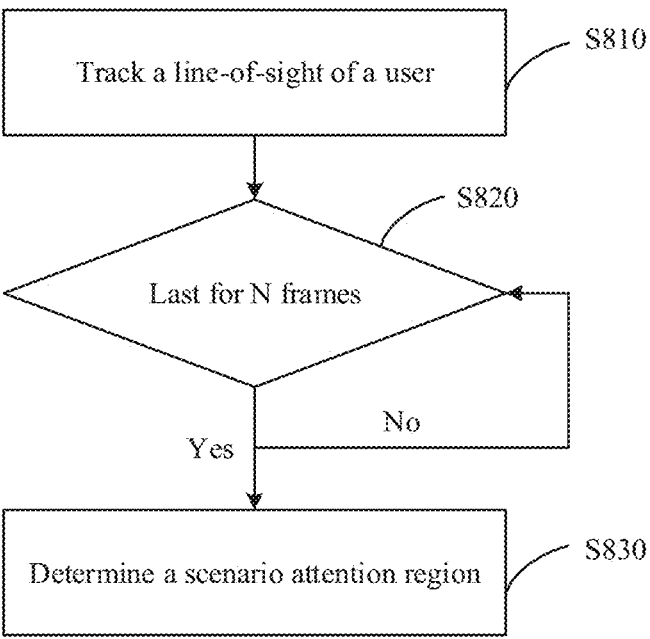
FIG. 12 is a schematic flowchart of scenario attention region determining in the intelligent terminal field according to an embodiment of this application.

It should be understood that FIG. 11 is a schematic flowchart of scenario attention region determining in the driving field. FIG. 12 is a schematic flowchart of scenario attention region determining in the intelligent terminal field. In the intelligent terminal field, the method for identifying an object of interest provided in this application may be used to determine a specific object in which a user has an interest in a home device, and provide corresponding interaction.

In the intelligent terminal field, the method for identifying an object of interest is similar to the procedures shown in FIG. 6 to FIG. 10, and a difference lies in the following: A line-of-sight-gazed region of a driver is obtained in the driving field, and a line-of-sight-gazed region of a user is obtained in the intelligent terminal field. In addition, procedures of scenario attention region determining are different.

A procedure of scenario attention region determining in the intelligent terminal field is described below in detail with reference to FIG. 12. Scenario attention region determining shown in FIG. 12 may include step S810 to step S830, and these steps are separately described below in detail.

S810: Track a line-of-sight of a user, that is, obtain a line-of-sight-gazed region of the user.

For example, an image of the user may be obtained by using a camera of an intelligent terminal. For example, the image of the user may be collected by using a camera in a smart screen.

S820: Determine whether the line-of-sight-gazed region of the user lasts for N frames; and perform S830 if the line-of-sight-gazed region of the user lasts for N frames; or go back if the line-of-sight-gazed region of the user does not last for N frames.

It should be understood that in the intelligent terminal field, for example, for a smart home device, it is usually considered by default that the smart home device cannot move. Therefore, it may be only required to determine line-of-sight-gazed regions of the user in consecutive N frames, and scenario attention predetermining does not need to be performed in N frames. To be specific, it is assumed that an object in a scenario does not move, the line-of-sight-gazed region of the user needs to be obtained to determine whether the line-of-sight-gazed region of the user remains unchanged or changes in a relatively small range in N frames of images, that is, determine whether the user continuously gazes at a specific object in a period of time.

S830: Determine a scenario attention region.

For example, an object at which the user really gazes may be determined based on line-of-sight-gazed regions of the user and scenario attention predetermining in consecutive N frames. For a specific procedure of scenario attention predetermining, refer to the specific description in FIG. 10. Details are not described herein again.

It should be noted that the foregoing example description is intended to help a person skilled in the art understand the embodiments of this application, and is not intended to limit the embodiments of this application to a specific value or a specific scenario of the example. A person skilled in the art clearly can make various equivalent modifications or changes according to the examples described above, and such modifications or changes also fall within the scope of embodiments of this application.

The method for identifying an object of interest of a user in the embodiments of this application is described above in detail with reference to FIG. 1 to FIG. 12. Apparatus embodiments of this application are described below in detail with reference to FIG. 13 and FIG. 14. It should be understood that the apparatus for identifying an object of interest of a user in the embodiments of this application may perform the foregoing methods for identifying an object of interest of a user in the embodiments of this application. In other words, for specific working processes of the following products, refer to corresponding processes in the foregoing method embodiments.

Figure 13:
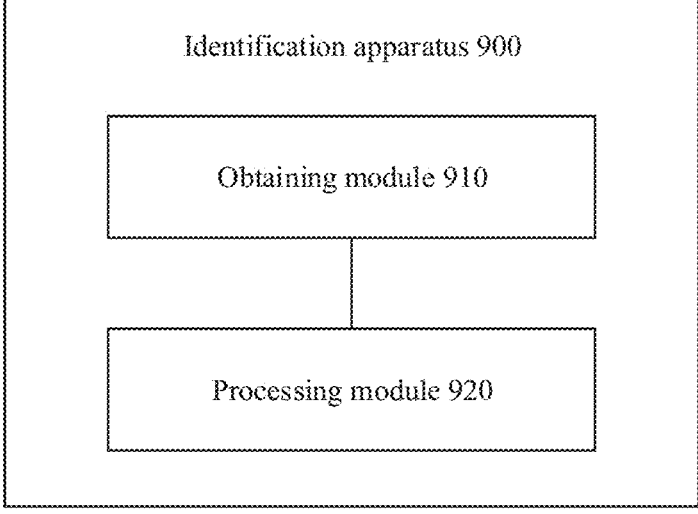
FIG. 13 is a schematic diagram of an apparatus for identifying an object of interest of a user according to an embodiment of this application.

FIG. 13 is a schematic block diagram of an apparatus for identifying an object of interest of a user according to an embodiment of this application.

It should be understood that an identification apparatus 900 shown in FIG. 13 is merely an example, and the apparatus in this embodiment of this application may further include another module or unit. It should be understood that the identification apparatus 900 can perform the steps in the identification methods in FIG. 5 to FIG. 12. To avoid repetition, details are not described herein again.

As shown in FIG. 13, the identification apparatus 900 may include an obtaining module 910 and a processing module 920. The obtaining module 910 is configured to obtain information about a line-of-sight-gazed region of a user and an environment image corresponding to the user. The processing module 920 is configured to: obtain information about a first gaze region of the user in the environment image based on the environment image, where the first gaze region is used to indicate a sensitive region determined by using a physical feature of a human body; and obtain a target gaze region of the user based on the information about the line-of-sight-gazed region and the information about the first gaze region, where the target gaze region is used to indicate a region in which a target object gazed by the user in the environment image is located.

Optionally, in a possible implementation, the processing module 920 is specifically configured to:

determine the target gaze region based on an overlapping region between the line-of-sight-gazed region and the first gaze region.

Optionally, in a possible implementation, the user is a user in a vehicle, and the obtaining module 910 is specifically configured to:

obtain information about a line-of-sight-gazed region of the user in the vehicle and an image of a driving video record in the vehicle, where the line-of-sight-gazed region of the user in the vehicle is used to indicate a gaze region that is of the user in the vehicle and that is outside the vehicle.

The processing module 920 is specifically configured to:

determine the target gaze region of the user in the vehicle based on the information about the line-of-sight-gazed region of the user in the vehicle and the information about the first gaze region in the image of the driving video record.

Optionally, in a possible implementation, the obtaining module 910 is specifically configured to:

obtain information about line-of-sight-gazed regions of the user in the vehicle in N frames of images and M frames of images of the driving video record, where the N frames of images and the M frames of images of the driving video record are images obtained from a same start moment to a same end moment, and both N and M are positive integers.

The processing module 920 is specifically configured to:

determine that a difference between the line-of-sight-gazed regions of the user in the vehicle in the N frames of images meets a first preset range;

determine that a difference between the first gaze regions in the M frames of images of the driving video record meets a second preset range;

determine an overlapping region based on the line-of-sight-gazed regions of the user in the vehicle in the N frames of images and the first gaze regions in the M frames of images of the driving video record; and determine the target gaze region of the user in the vehicle based on the overlapping region.

Optionally, in a possible implementation, the difference between the line-of-sight-gazed regions is a location difference between the line-of-sight-gazed regions, and the difference between the first gaze regions is a location difference between the first gaze regions.

Optionally, in a possible implementation, the processing module 920 is further configured to:

map the line-of-sight-gazed region of the user in the vehicle to an imaging plane on which the image of the driving video record is located; or map the image of the driving video record to an imaging plane on which the line-of-sight-gazed region of the user in the vehicle is located.

Optionally, in a possible implementation, the processing module 920 is further configured to:

display information about the target gaze region on a display of the vehicle.

Optionally, in a possible implementation, the vehicle includes a plurality of displays, and the processing module 920 is specifically configured to:

determine a target display in the plurality of displays based on location information that is of the user in the vehicle and that is in the vehicle; and display the information about the target gaze region on the target display.

Optionally, in a possible implementation, the processing module 920 is further configured to:

display the information about the target gaze region in the vehicle by using a head-up display HUD system.

Optionally, in a possible implementation, the user in the vehicle is a driver of the vehicle or a passenger in the vehicle.

In a possible implementation, the identification apparatus 900 is a vehicle, the obtaining module is an interface circuit in the vehicle, and the processing module is a processor in the vehicle.

For example, the interface circuit in the vehicle may obtain, by using a communications network, information about a line-of-sight-gazed region that is of a user and that is collected by a camera (for example, a camera in a DMS or a camera in a CMS) configured inside the vehicle, and obtain an environment image photographed by a driving video record during traveling of the vehicle. The DMS or the CMS may be integrated into the vehicle. The identification method in the foregoing embodiment of this application may be implemented by using a software algorithm. The processor may obtain, from the interface circuit, the information about the line-of-sight-gazed region of the user and the environment image, and perform the identification method in this application by using an integrated logic circuit or instructions in a form of software.

In a possible implementation, the identification apparatus 900 is a vehicle-mounted device in a vehicle, the obtaining module is an interface circuit in the vehicle-mounted device, and the processing module is a processor in the vehicle-mounted device.

For example, the interface circuit in the vehicle-mounted device may obtain, by using a communications network, information about a line-of-sight-gazed region that is of a user and that is collected by a camera (for example, a camera in a DMS or a camera in a CMS) configured inside the vehicle, and obtain an environment image photographed by a driving video record during traveling of the vehicle. The processor obtains, from the interface circuit, the information about the line-of-sight-gazed region of the user and the environment image, and performs the identification method in this application by using an integrated logic circuit or instructions in a form of software.

The communications network may be 3G cellular communication such as CDMA, EVDO, or GSM/GPRS, 4G cellular communication such as LTE, or 5G cellular communication. The communications network may communicate with a wireless local region network through wireless Internet access (WiFi). Alternatively, the communications network may directly communicate with a device by using an infrared link, Bluetooth, or ZigBee (ZigBee), or may use other wireless protocols such as various vehicle communications systems. For example, the communications network may include one or more dedicated short range communications devices, and these devices may include public and/or private data communication between vehicles and/or roadside stations.

It should be understood that the identification apparatus 900 herein is embodied in a form of a function unit. The term "module" herein may be implemented in a form of software and/or hardware, and this is not specifically limited.

For example, the "module" may be a software program, a hardware circuit, or a combination thereof that implements the foregoing functions. The hardware circuit may include an application-specific integrated circuit (application-specific integrated circuit, ASIC), an electronic circuit, a processor (for example, a shared processor, a special-purpose processor, or a group processor) configured to execute one or more software or firmware programs, a memory, a merged logic circuit, and/or another appropriate component that supports the described functions.

Therefore, the units in the examples described in the embodiments of this application can be implemented by using electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

Figure 14:
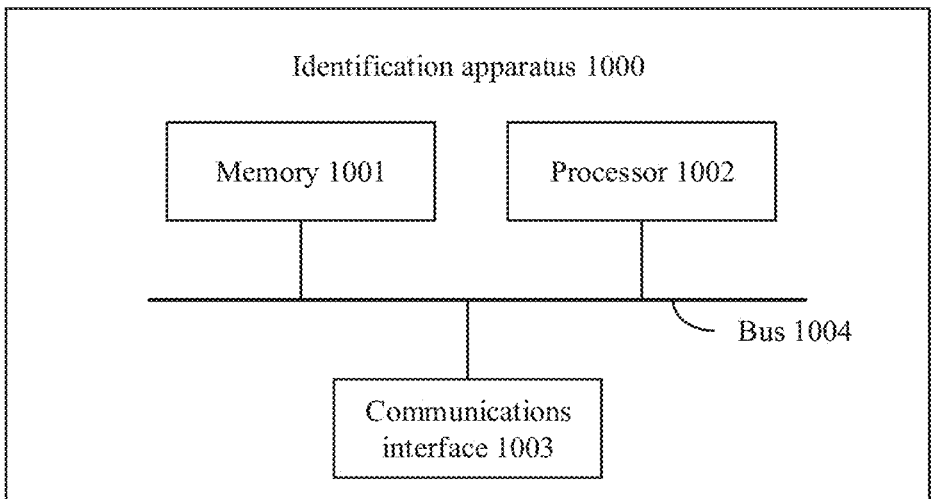
FIG. 14 is a schematic diagram of an apparatus for identifying an object of interest of a user according to an embodiment of this application.

FIG. 14 is a schematic block diagram of an apparatus for identifying an object of interest of a user according to an embodiment of this application.

An identification apparatus 1000 shown in FIG. 14 includes a memory 1001, a processor 1002, a communications interface 1003, and a bus 1004. The memory 1001, the processor 1002, and the communications interface 1003 implement communication connection with each other by using the bus 1004.

The memory 1001 may be a read-only memory (read-only memory, ROM), a static storage device, a dynamic storage device, or a random access memory (random access memory, RAM). The memory 1001 may store a program. When the program stored in the memory 1001 is executed by the processor 1002, the processor 1002 is configured to perform the steps of the method for identifying an object of interest of a user in the embodiments of this application, for example, may perform the steps in the embodiments shown in FIG. 5 to FIG. 12.

The processor 1002 may be a general-purpose central processing unit (central processing unit, CPU), a microprocessor, an application specific integrated circuit (application specific integrated circuit, ASIC), or one or more integrated circuits, and is configured to execute a related program to implement the method for identifying an object of interest of a user in the method embodiment of this application.

The processor 1002 may be an integrated circuit chip and has a signal processing capability. In an implementation process, the steps of the method for identifying an object of interest of a user in the embodiments of this application may be completed by using an integrated logic circuit of hardware in the processor 1002 or instructions in a form of software.

The foregoing processor 1002 may be a general-purpose processor, a digital signal processor (digital signal processor, DSP), an application-specific integrated circuit (ASIC), a field programmable gate array (field programmable gate array, FPGA) or another programmable logic device, a discrete gate or transistor logic device, or a discrete hardware component. The processor may implement or perform the methods, steps, and logical block diagrams that are disclosed in embodiments of this application. The general-purpose processor may be a microprocessor, or the processor may be any conventional processor or the like.

The steps in the methods disclosed with reference to embodiments of this application may be directly performed and completed by a hardware decoding processor, or may be performed and completed by using a combination of hardware in the decoding processor and a software module. The software module may be located in a mature storage medium in the art, such as a random access memory, a flash memory, a read-only memory, a programmable read-only memory, an electrically erasable programmable memory, or a register. The storage medium is located in the memory 1001. The processor 1002 reads information in the memory 1001, and with reference to hardware of the processor 1002, completes a function that needs to be performed by a module included in the identification apparatus shown in FIG. 13 in the embodiments of this application, or performs the method for identifying an object of interest of a user in the method embodiment of this application, for example, may perform the steps/functions in the embodiments shown in FIG. 5 to FIG. 12.

The communications interface 1003 may be but unnecessarily be a transceiver apparatus such as a transceiver for implementing communication between the identification apparatus 1000 and another device or a communications network.

The bus 1004 may include a path for transmitting information between components (for example, the memory 1001, the processor 1002, and the communications interface 1003) of the identification apparatus 1000.

It should be noted that although the identification apparatus 1000 shows only a memory, a processor, and a communications interface, in a specific implementation process, a person skilled in the art should understand that the identification apparatus 1000 may further include another component required for implementing normal running. In addition, a person skilled in the art should understand that, based on a specific requirement, the identification apparatus 1000 may further include a hardware component that implements another additional function. In addition, a person skilled in the art should understand that the identification apparatus 1000 may include only a component required for implementing the embodiments of this application, and does not need to include all the components shown in FIG. 14.

It should be understood that the identification apparatus shown in this embodiment of this application may be a vehicle-mounted device in a vehicle, or may be a chip configured in the vehicle-mounted device.

An embodiment of this application further provides a vehicle, and the vehicle includes the apparatus for identifying an object of interest of a user in the foregoing embodiment of this application.

An embodiment of this application further provides a vehicle system, including a camera configured inside a vehicle, a driving video record, and the apparatus for identifying an object of interest of a user in the foregoing embodiment of this application.

An embodiment of this application further provides a chip, and the chip includes a transceiver unit and a processing unit. The transceiver unit may be an input/output circuit or a communications interface. The processing unit is a processor, a microprocessor, or an integrated circuit integrated on the chip. The chip may perform the method for identifying an object of interest of a user in the foregoing method embodiment.

An embodiment of this application further provides a computer-readable storage medium, and the computer-readable storage medium stores instructions. When the instructions are executed, the method for identifying an object of interest of a user in the foregoing method embodiment is performed.

An embodiment of this application further provides a computer program product including instructions. When the instructions are executed, the method for identifying an object of interest of a user in the foregoing method embodiment is performed.

It should be understood that the processor in embodiments of this application may be a central processing unit (central processing unit, CPU), or may be another general-purpose processor, a digital signal processor (digital signal processor, DSP), an application-specific integrated circuit (application-specific integrated circuit, ASIC), a field programmable gate array (field programmable gate array, FPGA) or another programmable logic device, a discrete gate or transistor logic device, a discrete hardware component, or the like. The general-purpose processor may be a microprocessor, or the processor may be any conventional processor or the like.

It should be further understood that the memory in embodiments of this application may be a volatile memory or a nonvolatile memory, or may include both a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM) and is used as an external cache. By way of example, but not limitation, many forms of random access memories (random access memory, RAM) can be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

All or some of embodiments may be implemented by using software, hardware, firmware, or any combination thereof. When software is used to implement embodiments, all or some of embodiments may be implemented in a form of a computer program product. The computer program product includes one or more computer instructions or computer programs. When the program instructions or the computer programs are loaded and executed on a computer, all or some of the procedures or functions according to embodiments of this application are generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification is merely an association relationship that describes associated objects, and represents that there may be three relationships. For example, A and/or B may represent three cases: only A exists, both A and B exist, and only B exists, where A and B may be singular numbers or plural numbers. In addition, the character "/" in this specification usually indicates that associated objects are in an "or" relationship, but may alternatively indicate an "and/or" relationship. This may be specifically understood with reference to context.

In this application, "at least one" means one or more, and "a plurality of" means two or more. In addition, "at least one of the following items (pieces)" or a similar expression thereof means any combination of these items, including any combination of singular items (pieces) or plural items (pieces). For example, at least one item (piece) of a, b, or c may indicate: a, b, c, a and b, a and c, b and c, or a, b, and c, where a, b, and c may be singular or plural.

It should be understood that sequence numbers of the foregoing processes do not mean execution sequences in embodiments of this application. The execution sequences of the processes should be determined based on functions and internal logic of the processes, and should not constitute any limitation on implementation processes of embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In several embodiments provided in this application, it should be understood that the disclosed system, apparatus, and method may be implemented in another manner. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, that is, may be located in one location, or may be distributed on a plurality of network units. Some or all of the units may be selected according to actual requirements to achieve the objectives of the solutions of embodiments.

In addition, function units in embodiments of this application may be integrated into one processing unit, each of the units may exist alone physically, or two or more units may be integrated into one unit.

When the functions are implemented in the form of a software function unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for identifying an object of interest of a user, comprising:

obtaining information about a line-of-sight-gazed region of the user and an environment image corresponding to the user, wherein the environment image includes a plurality of regions;

obtaining information about a first gaze region of the user in the environment image based on the environment image, wherein the first gaze region is obtained based on a plurality of interest values corresponding to the plurality of regions, each interest value is obtained based on at least color change richness of the corresponding region, and the first gaze region is used to indicate a sensitive region determined by using a physical feature of a human body;

obtaining a target gaze region of the user based on the information about the line-of-sight-gazed region and the information about the first gaze region, wherein the target gaze region is used to indicate a region in which a target object gazed by the user in the environment image is located;

obtaining identity information of the user; and displaying information about the target gaze region based on the identity information of the user.

2. The method according to claim 1, wherein the obtaining a target gaze region of the user based on the information about the line-of-sight-gazed region and the information about the first gaze region comprises:

determining the target gaze region based on an overlapping region between the line-of-sight-gazed region and the first gaze region.

3. The method according to claim 1, wherein the user is a user in a vehicle, and the obtaining information about a line-of-sight-gazed region of the user and an environment image corresponding to the user comprises:

obtaining information about a line-of-sight-gazed region of the user in the vehicle and an image of a driving video record in the vehicle, wherein the line-of-sight-gazed region of the user in the vehicle is used to indicate information about a gaze region that is of the user in the vehicle and that is outside the vehicle; and the obtaining a target gaze region of the user based on the information about the line-of-sight-gazed region and the information about the first gaze region comprises:

determining the target gaze region of a driver based on the information about the line-of-sight-gazed region of the user in the vehicle and the information about the first gaze region in the image of the driving video record.

4. The method according to claim 3, wherein the obtaining information about a line-of-sight-gazed region of the user in the vehicle and an image of a driving video record in the vehicle comprises:

obtaining information about line-of-sight-gazed regions of the user in the vehicle in N frames of images and M frames of images of the driving video record, wherein the N frames of images and the M frames of images of the driving video record are images obtained from a same start moment to a same end moment, and both N and M are positive integers; and the determining the target gaze region of a driver based on the information about the line-of-sight-gazed region of the user in the vehicle and the information about the first gaze region in the image of the driving video record comprises:

determining that a difference between the line-of-sight-gazed regions of the user in the vehicle in the N frames of images meets a first preset range;

determining that a difference between the first gaze regions in the M frames of images of the driving video record meets a second preset range;

determining an overlapping region based on the line-of-sight-gazed regions of the user in the vehicle in the N frames of images and the first gaze regions in the M frames of images of the driving video record; and determining the target gaze region of the user in the vehicle based on the overlapping region.

5. The method according to claim 4, wherein the difference between the line-of-sight-gazed regions is a location difference between the line-of-sight-gazed regions, and the difference between the first gaze regions is a location difference between the first gaze regions.

6. The method according to claim 3, further comprising:
mapping the line-of-sight-gazed region of the user in the vehicle to an imaging plane on which the image of the driving video record is located; or
mapping the image of the driving video record to an imaging plane on which the line-of-sight-gazed region of the user in the vehicle is located.

7. The method according to claim 3, further comprising:
displaying information about the target gaze region on a display of the vehicle.

8. The method according to claim 7, wherein the vehicle comprises a plurality of displays, and the displaying information about the target gaze region on a display of the vehicle comprises:
determining a target display in the plurality of displays based on location information that is of the user in the vehicle; and
displaying the information about the target gaze region on the target display.

9. The method according to claim 3, further comprising:
displaying information about the target gaze region in the vehicle by using a head-up display (HUD) system.

10. The method according to claim 3, wherein the user in the vehicle is a driver of the vehicle, or a passenger in the vehicle.

11. An apparatus for identifying an object of interest of a user, comprising at least one processor and a memory, wherein the memory stores program instructions for execution by the at least one processor to perform operations comprising:
obtaining information about a line-of-sight-gazed region of the user and an environment image corresponding to the user, wherein the environment image includes a plurality of regions;
obtaining information about a first gaze region of the user in the environment image based on the environment image, wherein the first gaze region is obtained based on a plurality of interest values corresponding to the plurality of regions, each interest value is obtained based on at least color change richness of the corresponding region, and the first gaze region is used to indicate a sensitive region determined by using a physical feature of a human body;
obtaining a target gaze region of the user based on the information about the line-of-sight-gazed region and the information about the first gaze region, wherein the target gaze region is used to indicate a region in which a target object gazed by the user in the environment image is located;
obtaining identity information of the user; and
displaying information about the target gaze region based on the identity information of the user.

12. The apparatus according to claim 11, wherein the obtaining a target gaze region of the user based on the information about the line-of-sight-gazed region and the information about the first gaze region comprises:
determining the target gaze region based on an overlapping region between the line-of-sight-gazed region and the first gaze region.

13. The apparatus according to claim 11, wherein the user is a user in a vehicle, and the obtaining information about a line-of-sight-gazed region of the user and an environment image corresponding to the user comprises:

obtaining information about a line-of-sight-gazed region of the user in the vehicle and an image of a driving video record in the vehicle, wherein the line-of-sight-gazed region of the user in the vehicle is used to indicate information about a gaze region that is of the user in the vehicle and that is outside the vehicle; and
the obtaining a target gaze region of the user based on the information about the line-of-sight-gazed region and the information about the first gaze region comprises:
determining the target gaze region of a driver based on the information about the line-of-sight-gazed region of the user in the vehicle and the information about the first gaze region in the image of the driving video record.

14. The apparatus according to claim 13, wherein the obtaining information about a line-of-sight-gazed region of the user in the vehicle and an image of a driving video record in the vehicle comprises:
obtaining information about line-of-sight-gazed regions of the user in the vehicle in N frames of images and M frames of images of the driving video record, wherein the N frames of images and the M frames of images of the driving video record are images obtained from a same start moment to a same end moment, and both N and M are positive integers; and
the determining the target gaze region of a driver based on the information about the line-of-sight-gazed region of the user in the vehicle and the information about the first gaze region in the image of the driving video record comprises:
determining that a difference between the line-of-sight-gazed regions of the user in the vehicle in the N frames of images meets a first preset range;
determining that a difference between the first gaze regions in the M frames of images of the driving video record meets a second preset range;
determining an overlapping region based on the line-of-sight-gazed regions of the user in the vehicle in the N frames of images and the first gaze regions in the M frames of images of the driving video record; and
determining the target gaze region of the user in the vehicle based on the overlapping region.

15. The apparatus according to claim 14, wherein the difference between the line-of-sight-gazed regions is a location difference between the line-of-sight-gazed regions, and the difference between the first gaze regions is a location difference between the first gaze regions.

16. The apparatus according to claim 13, wherein the operations further comprise:
mapping the line-of-sight-gazed region of the user in the vehicle to an imaging plane on which the image of the driving video record is located; or
mapping the image of the driving video record to an imaging plane on which the line-of-sight-gazed region of the user in the vehicle is located.

17. The apparatus according to claim 13, wherein the operations further comprise:
displaying information about the target gaze region on a display of the vehicle.

18. A non-transitory computer-readable storage medium, wherein the non-transitory computer-readable storage medium stores program instructions for execution by at least one processor, and wherein the programming instructions instruct the at least one processor to perform operations comprising:

obtaining information about a line-of-sight-gazed region of a user and an environment image corresponding to the user, wherein the environment image includes a plurality of regions;

obtaining information about a first gaze region of the user in the environment image based on the environment image, wherein the first gaze region is obtained based on a plurality of interest values corresponding to the plurality of regions, each interest value is obtained based on at least color change richness of the corresponding region, and the first gaze region is used to indicate a sensitive region determined by using a physical feature of a human body;

obtaining a target gaze region of the user based on the information about the line-of-sight-gazed region and the information about the first gaze region, wherein the target gaze region is used to indicate a region in which a target object gazed by the user in the environment image is located;

obtaining identity information of the user; and displaying information about the target gaze region based on the identity information of the user.

19. The method according to claim 1, wherein displaying the information about the target gaze region based on the identity information of the user comprises:

based on the identity information of the user indicating a driver of a vehicle, displaying the information about the target gaze region using a head-up display (HUD) of the vehicle.

20. The method according to claim 1, wherein displaying the information about the target gaze region based on the identity information of the user comprises:

based on the identity information of the user indicating a passenger of a vehicle, displaying the information about the target gaze region using a display of the vehicle corresponding to location information of the user in the vehicle.

* * * * *